United States Patent
Harada et al.

(10) Patent No.: US 11,388,686 B2
(45) Date of Patent: Jul. 12, 2022

(54) USER TERMINAL AND RADIO COMMUNICATION METHOD

(71) Applicant: NTT DOCOMO, INC., Tokyo (JP)

(72) Inventors: Hiroki Harada, Tokyo (JP); Tomoya Ohara, Tokyo (JP); Daisuke Murayama, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 59 days.

(21) Appl. No.: 16/645,414

(22) PCT Filed: Sep. 8, 2017

(86) PCT No.: PCT/JP2017/032589
§ 371 (c)(1),
(2) Date: Mar. 6, 2020

(87) PCT Pub. No.: WO2019/049350
PCT Pub. Date: Mar. 14, 2019

(65) Prior Publication Data
US 2020/0288417 A1    Sep. 10, 2020

(51) Int. Cl.
*H04W 56/00* (2009.01)
*H04W 72/04* (2009.01)
*H04W 72/00* (2009.01)
*H04W 24/10* (2009.01)
*H04W 74/08* (2009.01)

(52) U.S. Cl.
CPC ......... *H04W 56/001* (2013.01); *H04W 24/10* (2013.01); *H04W 72/005* (2013.01); *H04W 72/0453* (2013.01); *H04W 74/0808* (2013.01)

(58) Field of Classification Search
CPC ............ H04W 72/044; H04W 72/005; H04W 56/001; H04W 72/04; H04W 16/28; H04W 72/0453; H04W 24/10; H04W 74/0808
See application file for complete search history.

(56) References Cited

U.S. PATENT DOCUMENTS

2018/0227832 A1    8/2018   Da Silva et al.
2018/0279152 A1*   9/2018   Kim .................... H04W 72/046
2018/0324843 A1*   11/2018  Lee ....................... H04L 5/0053
(Continued)

FOREIGN PATENT DOCUMENTS

WO    2017/028881 A1    2/2017

OTHER PUBLICATIONS

Extended European Search Report issued in counterpart European Patent Application No. 17924341.5, dated Mar. 18, 2021 (9 pages).
(Continued)

*Primary Examiner* — Brian D Nguyen
(74) *Attorney, Agent, or Firm* — Osha Bergman Watanabe & Burton LLP

(57) ABSTRACT

Measurement is efficiently performed while suppressing an increase in an overhead. A user terminal according to the present invention includes: a reception section that receives frequency information indicating a plurality of frequencies in a single component carrier; and a control section that, when a signal block including a synchronization signal and a broadcast signal is transmitted at each of the plurality of frequencies, controls measurement at the plurality of frequencies.

6 Claims, 14 Drawing Sheets

(56) References Cited

U.S. PATENT DOCUMENTS

| | | | | |
|---|---|---|---|---|
| 2020/0037385 | A1* | 1/2020 | Park | H04W 72/04 |
| 2020/0092880 | A1* | 3/2020 | Choi | H04W 72/042 |
| 2020/0119895 | A1* | 4/2020 | Choi | H04W 76/27 |
| 2020/0187246 | A1* | 6/2020 | Amuru | H04L 5/0053 |
| 2020/0195358 | A1* | 6/2020 | Yokomakura | H04L 5/0094 |
| 2020/0213960 | A1* | 7/2020 | Jung | H04W 72/1257 |
| 2020/0221428 | A1* | 7/2020 | Moon | H04L 5/00 |
| 2020/0344034 | A1* | 10/2020 | Moon | H04L 5/0092 |
| 2021/0153162 | A1* | 5/2021 | Chen | H04W 56/001 |
| 2021/0185710 | A1* | 6/2021 | Kim | H04L 5/0007 |
| 2021/0337438 | A1* | 10/2021 | Xiong | H04W 36/0058 |

OTHER PUBLICATIONS

LG Electronics; "RMSI delivery and CORESET configuration"; 3GPP TSG RAN WG1 Meeting #90, R1-1713125; Prague, Czech Republic, Aug. 21-25, 2017 (8 pages).

AT&T; "RACH configuration details"; 3GPP TSG RAN WG1 Meeting #90, R1-1712699; Prague, P.R. Czechia, Aug. 21-15, 2017 (3 pages).

International Search Report issued in PCT/JP2017/032589 dated Nov. 28, 2017 (1 page).

Written Opinion of the International Searching Authority issued in PCT/JP2017/032589 dated Nov. 28, 2017 (3 pages).

Qualcomm; "WF on SS block transmission in wideband CC"; 3GPP TSG RAN WG1 Meeting #90, R1-1715160; Prague, Czech Republic; Aug. 21-25, 2017 (7 pages).

Intel Corporation; "SS Block(s) in Wideband Component Carrier"; 3GPP TSG RAN WG1 Meeting #90, R1-1712524; Prague, Czech Republic; Aug. 21-25, 2017 (5 pages).

ZTE; "Multiple SS blocks in wide band CC"; 3GPP TSG RAN WG1 Meeting #90, R1-1712058; Prague, Czechia; Aug. 21-25, 2017 (6 pages).

Intel Corporation; "Signaling configuration for xSS"; 3GPP TSG RAN WG2 Meeting #98, R2-1704769; Hangzhou, China; May 15-19, 2017 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart Russian Patent Application No. 2021106307, dated Sep. 27, 2021 (10 pages).

Office Action issued in the counterpart Japanese Patent Application No. 2019-540270, dated Nov. 24, 2021 (6 pages).

\* cited by examiner

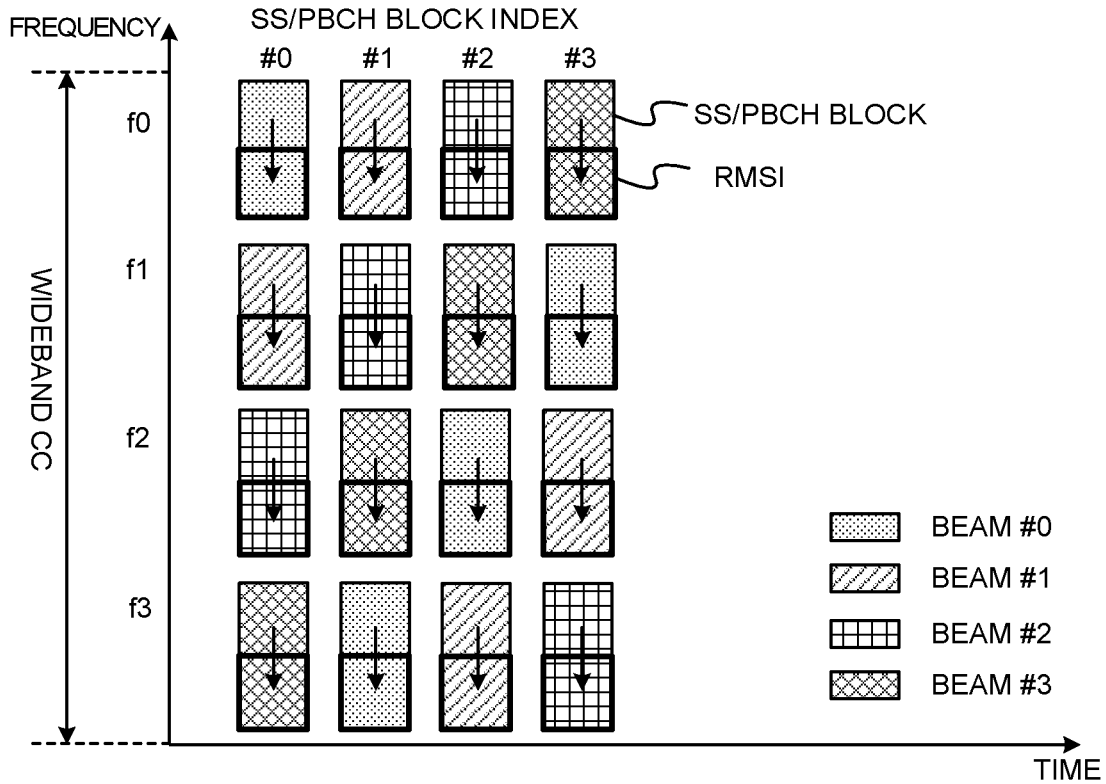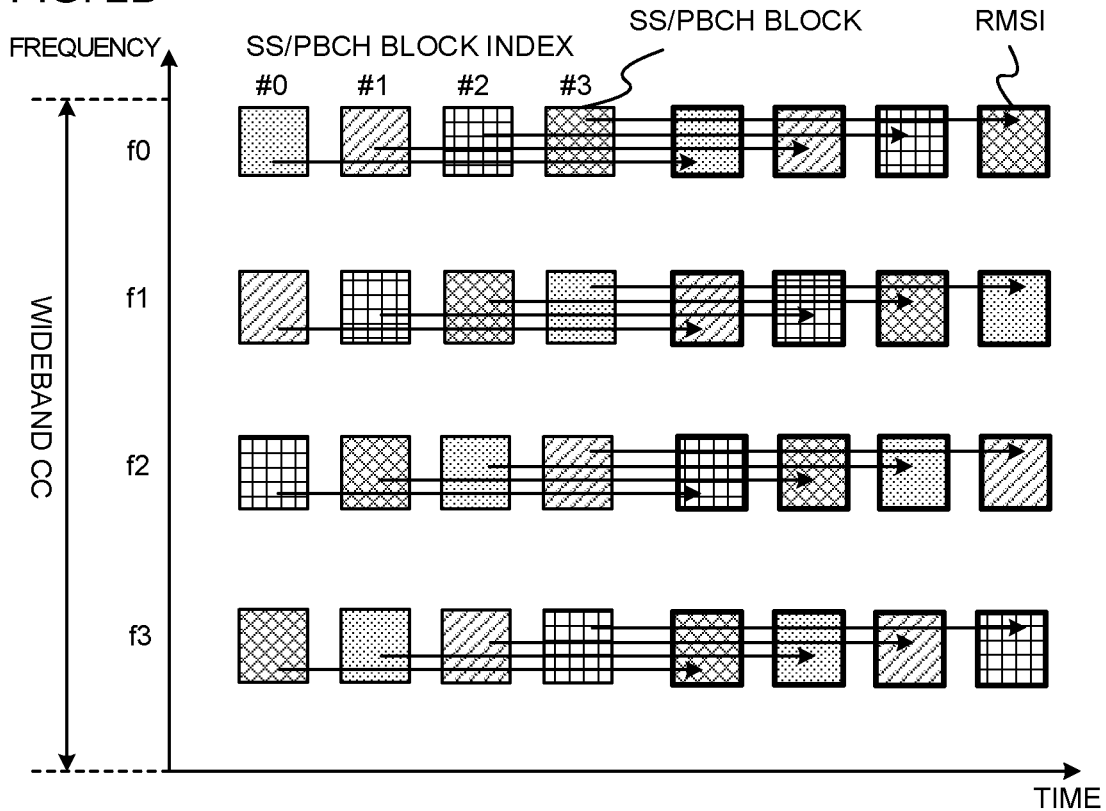

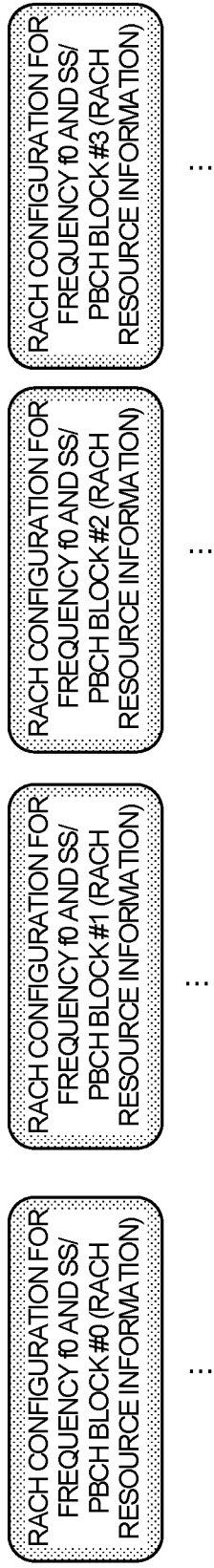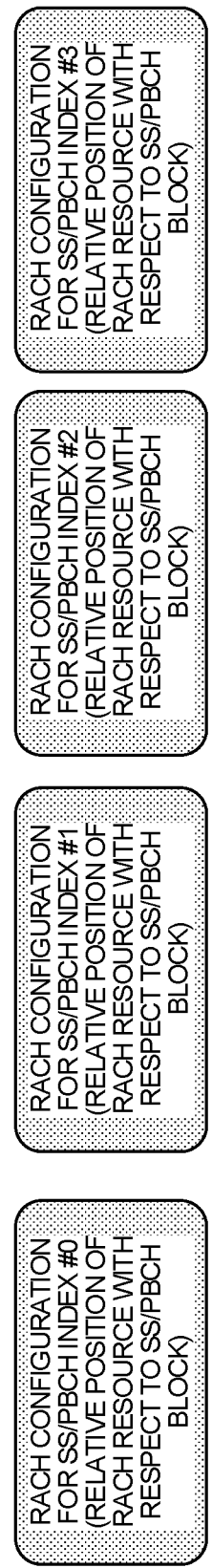

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for a larger capacity and higher sophistication than those of LTE (LTE Rel. 8 and 9), LTE-Advanced (LTE-A or LTE Rel. 10, 11, 12 and 13) has been specified.

LTE successor systems (also referred to as, for example, Future Radio Access (FRA), the 5th generation mobile communication system (5G), 5G+(plus), New Radio (NR), New radio access (NX), Future generation radio access (FX) or LTE Rel. 14, 15 or subsequent releases) have been also studied.

In legacy LTE systems (e.g., LTE Rel. 8 to 13), a user terminal (UE: User Equipment) detects Synchronization Signals (SSs including, for example, a Primary Synchronization Signal (PSS) and/or a Secondary Synchronization Signal (SSS)) by an initial access procedure (also referred to as, for example, cell search), synchronizes with a network (e.g., a base station (eNB: eNode B)), and identifies a cell (i.e., identifies the cell based on, for example, a cell Identifier (ID)) to connect with.

Furthermore, after cell search, the user terminal receives broadcast information (MIB: Master Information Block) transmitted on a broadcast channel (PBCH: Physical Broadcast Channel) or system information (SIB: System Information Block) transmitted on a Downlink (DL) shared channel (PDSCH: Physical Downlink Shared Channel), and obtains configuration information (that may be referred to as broadcast information or system information) for communicating with a network.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It has been studied for a future radio communication system (e.g., NR or 5G) to define a signal block (also referred to as, for example, an SS/PBCH block) including a Synchronization Signal (also referred to as, for example, an SS, a PSS and/or an SSS, or an NR-PSS and/or an NR-SSS) and a broadcast channel (also referred to as, for example, a broadcast signal, a PBCH or an NR-PBCH). An aggregation of one or more signal blocks will be also referred to as a signal burst (an SS/PBCH burst or an SS burst). A plurality of signal blocks in the signal burst are transmitted (also referred to as, for example, beam-swept) by different beams at different times.

Furthermore, it has been also studied for the future radio communication system to perform measurement by using the signal blocks. In this regard, measurement refers to measuring at least one of received power (e.g., RSRP: Reference Signal Received Power), received quality (e.g., an RSRQ: Reference Signal Received Quality or an SINR: Signal to Interference plus Noise Ratio), and a reception strength (e.g., RSSI: Reference Signal Strength Indicator), and will be also referred to as, for example, Radio Resource Management Measurement (RRM measurement).

However, there is a risk that, when measurement is performed by using a plurality of signal blocks transmitted by using beam sweep, a duration for measurement (measurement duration) becomes long. On other hand, there is a risk that shortening the measurement duration increases an overhead.

The present invention has been made in light of this point, and one of objects of the present invention is to provide a user terminal and a radio communication method that can efficiently perform measurement while suppressing an increase in an overhead.

Solution to Problem

A user terminal according to one aspect of the present invention includes: a reception section that receives frequency information indicating a plurality of frequencies in a single component carrier; and a control section that, when a signal block including a synchronization signal and a broadcast signal is transmitted at each of the plurality of frequencies, controls measurement at the plurality of frequencies.

Advantageous Effects of Invention

According to the present invention, it is possible to efficiently perform measurement while suppressing an increase in an overhead.

BRIEF DESCRIPTION OF DRAWINGS

FIGS. 2A and 2B are diagrams illustrating one example of an SS burst set.

FIG. 6 is a diagram illustrating one example of RACH configuration information according to a third aspect.

DESCRIPTION OF EMBODIMENTS

Figure 1A:
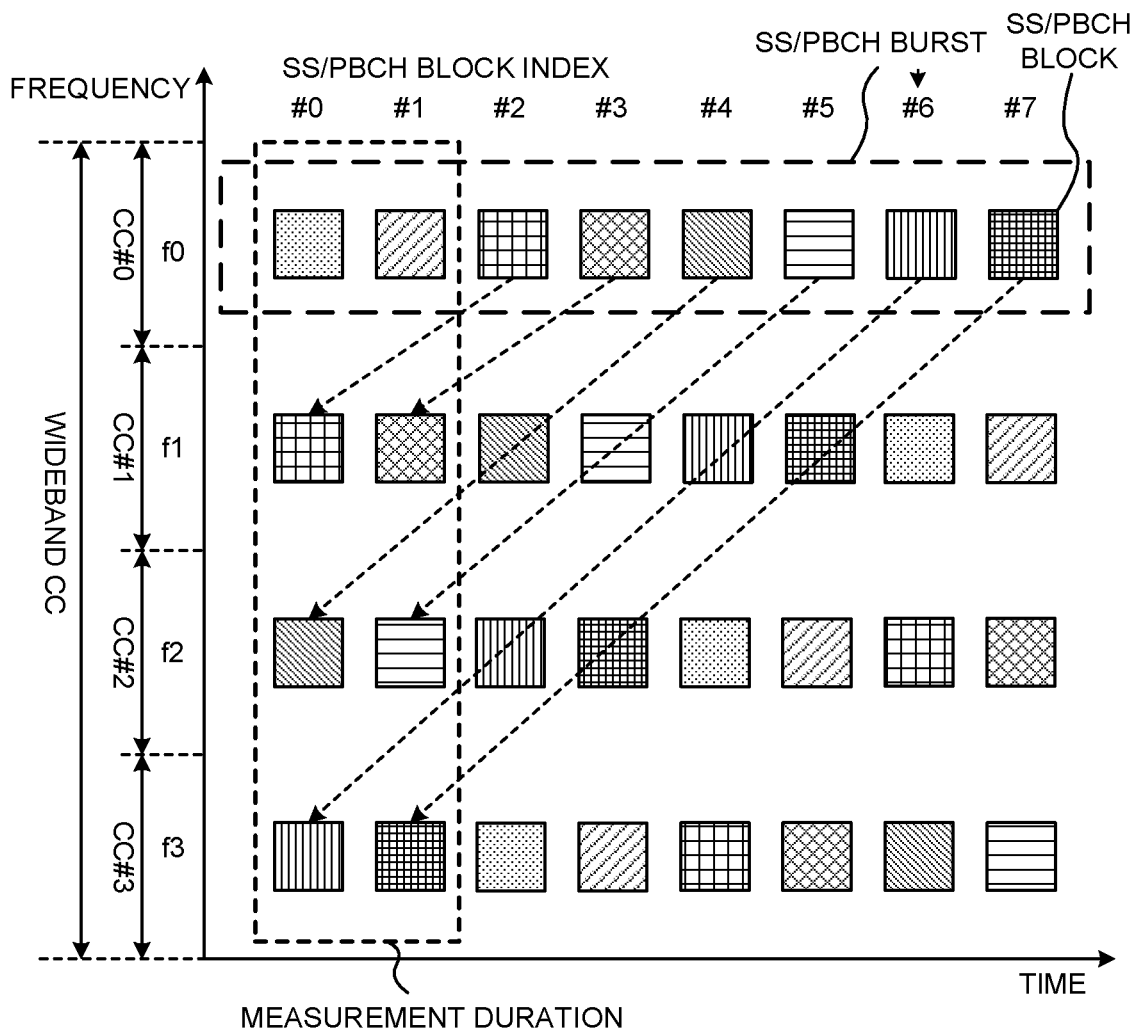
FIGS. 1A and 1B are diagrams illustrating one example of a measurement duration that uses SS/PBCH blocks.

It has been studied for a future radio communication system (e.g., LTE Rel. 14 or subsequent releases, 5G or NR) to define a signal block (also referred to as, for example, an SS/PBCH block) including a synchronization signal (also referred to as, for example, an SS, a PSS and/or an SSS, or an NR-PSS and/or an NR-SSS) and a broadcast channel (also referred to as, for example, a broadcast signal, a PBCH or an NR-PBCH). An aggregation of one or more signal blocks will be also referred to as a signal burst (an SS/PBCH burst or an SS burst). A plurality of signal blocks in the signal burst are transmitted (also referred to as, for example, beam-swept) by different beams at different times.

The SS/PBCH block includes one or more symbols (e.g., OFDM symbols). More specifically, the SS/PBCH block may include a plurality of contiguous symbols. A PSS, an SSS and an NR-PBCH may be arranged in one or more respectively different symbols in the SS/PBCH block. For example, it has been also studied for the SS/PBCH block that 4 or 5 symbols including 1 symbol for the PSS, 1 symbol for the SSS and 2 or 3 symbols for the PBCH compose the SS/PBCH block.

An aggregation of one or a plurality of SS/PBCH blocks may be referred to as an SS/PBCH burst. The SS/PBCH burst may include SS/PBCH blocks of contiguous frequency and/or time resources, or include SS/PBCH blocks of non-contiguous frequency and/or time resources. The SS/PBCH burst may be configured to a given periodicity (that may be also referred to as an SS/PBCH burst periodicity) or may be configured aperiodically.

Furthermore, one or a plurality of SS/PBCH bursts may be referred to as an SS/PBCH burst set (SS/PBCH burst series). The SS/PBCH burst set is periodically configured. A user terminal may control reception processing assuming that the SS/PBCH burst set is transmitted periodically (at an SS/PBCH burst set periodicity).

Each SS/PBCH block in the SS/PBCH burst set is identified based on a given index (SS/PBCH index). The SS/PBCH index may be any information for uniquely identifying the SS/PBCH block in the SS burst set, and may be associated with a time index.

The user terminal may assume Quasi-Collocation (QCL) of at least one of a space, an average gain, delay and Doppler parameters between SS/PBCH blocks having the same SS/PBCH index between SS/PBCH burst sets.

In this regard, the Quasi-Collocation (QCL) refers to that it is possible to assume that a space (beam) used for transmission of a plurality of different SS/PBCH blocks, and at least one of the average gain, the delay and the Doppler parameters between a plurality of SS/PBCH blocks are identical.

Furthermore, the user terminal may not assume the quasi-collocation of at least one of the space, the average gain, the delay and the Doppler parameters between the SS/PBCH blocks having different SS/PBCH indices in the SS/PBCH burst set and between the SS/PBCH burst sets.

By the way, it has been studied for the future radio communication system (e.g., LTE Rel. 14 or subsequent releases, 5G or NR) to support a wideband Component Carrier (CC) (wideband CC) (e.g., 400 MHz). The user terminal assumes a type (type 1) that supports the wideband CC as one CC, and a type (type 2) that aggregates a plurality of CCs by carrier aggregation, and supports the wideband CC. In a case of, for example, the type 2, 4 CCs that are each 100 MHz are aggregated to realize a wideband of 400 MHz.

It has been studied for this future radio communication system to transmit SS/PBCH blocks by using one or more frequencies in the wideband CC. Furthermore, it has been also studied to shorten a measurement duration of the above type 1 by transmitting the SS/PBCH blocks using a plurality of frequencies in the wideband CC.

In addition, the measurement duration will be also referred to as, for example, a measurement window, a measurement window duration, a measurement timing configuration duration, an SS/PBCH block based Measurement Timing Configuration (SMTC) duration or an SMTC window duration.

FIG. 1 is a diagram illustrating one example of a measurement duration that uses SS/PBCH blocks. FIG. 1A illustrates an SS/PBCH burst indicating eight SS/PBCH blocks. The SS/PBCH burst is transmitted at a plurality of frequencies in a wideband CC. In, for example, FIG. 1A, the wideband CC includes CCs #0 to #3 for the user terminal of the type 2, and therefore the SS/PBCH blocks are transmitted at respective frequencies f0 to f3 of the CCs #0 to #3.

In FIG. 1A, a network (e.g., radio base station) may notify a user terminal (e.g., the user terminal of the above type 1) of information indicating to which SS/PBCH block of which SS/PBCH block index of which other frequency an SS/PBCH block having a certain SS/PBCH block index of a certain frequency is quasi-collocated with regard to at least one of a space, an average gain, delay and a Doppler frequency (i.e., by which beam (antenna port) identical to which SS/PBCH block of the other frequency the SS/PBCH block is transmitted).

In, for example, FIG. 1A, SS/PBCH blocks of SS/PBCH block indices #2 and #3 of the frequency f0 are respectively transmitted by a beam identical to that of SS/PBCH blocks of SS/PBCH block indices #0 and #1 of the frequency f1. SS/PBCH blocks of SS/PBCH block indices #4 and #5 of the frequency f0 are respectively transmitted by a beam identical to that of SS/PBCH blocks of the SS/PBCH block indices #0 and #1 of the frequency f2. SS/PBCH blocks of SS/PBCH block indices #6 and #7 of the frequency f0 are respectively transmitted by a beam identical to that of SS/PBCH blocks of the SS/PBCH block indices #0 and #1 of the frequency f3.

In FIG. 1A, that the user terminal of the above type 1 monitors SS/PBCH blocks corresponding to two SS/PBCH block indices of a plurality of different frequencies f0 to f3 corresponds to monitoring eight SS/PBCH block indices of the single frequency f0. Consequently, it is possible to shorten a measurement duration of the user terminal of the above type 1 to a duration corresponding to the two SS/PBCH block indices.

In addition, in FIG. 1A, the same hatching between the different frequencies indicates the same beam. As illustrated in FIG. 1A, beam sweeping is performed in different order per frequency. Furthermore, in FIG. 1A, a plurality of beams of different frequencies are transmitted at the same timing.

Figure 1B:
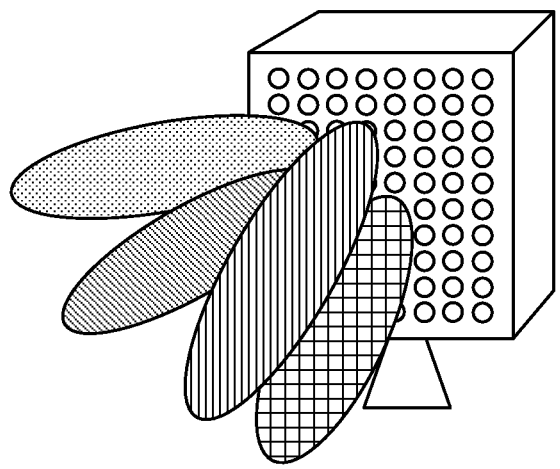

Therefore, in a case of analog beam forming, the radio base station needs to include a plurality of antenna panels, and perform transmission by using respectively different beams (see FIG. 1B). Furthermore, in FIG. 1A, digital beam forming may be applied.

However, there is a risk that notifying information indicating quasi-collocation of a plurality of SS/PBCH blocks of different frequencies and/or SS/PBCH block indices as illustrated in FIG. 1A increases an overhead.

Furthermore, the case illustrated in FIG. 1A has a risk that an overhead of system information (e.g., Remaining Minimum System Information (RMSI)) increases. FIG. 2 is a diagram illustrating one example of transmission of RMSI. FIG. 2A illustrates an SS/PBCH burst including four SS/PBCH blocks. The SS/PBCH burst is transmitted at each of the frequencies f0 to f3 in the wideband CC. The frequencies f0 to f3 may be included in each of different CCs provided in the wideband CC.

In FIG. 2A, RMSI associated with each SS/PBCH block at all of the frequencies f0 to f3 is subjected to frequency division multiplexing with each SS/PBCH block. On the other hand, in FIG. 2B, RMSI associated with each SS/PBCH block at all of the frequencies f0 to f3 is subjected to time division multiplexing with each SS/PBCH block.

In FIGS. 2A and 2B, broadcast information to be conveyed on a PBCH in each SS/PBCH block may include information (e.g., configuration information of a resource set (CORESET: Control Resource Set) for DCI (PDCCH) for scheduling the RMSI) related to the RMSI to be transmitted by a beam identical to that of each SS/PBCH block. The user terminal receives the RMSI associated with a detected SS/PBCH block based on the broadcast information.

However, when the RMSI associated with each SS/PBCH block of all frequencies is transmitted as illustrated in FIGS. 2A and 2B, an overhead of the RMSI becomes enormous. Therefore, it has been studied to transmit RMSI associated with each SS/PBCH block of only part of frequencies. FIG. 3 is a diagram illustrating another example of transmission of RMSI.

Figure 3A:
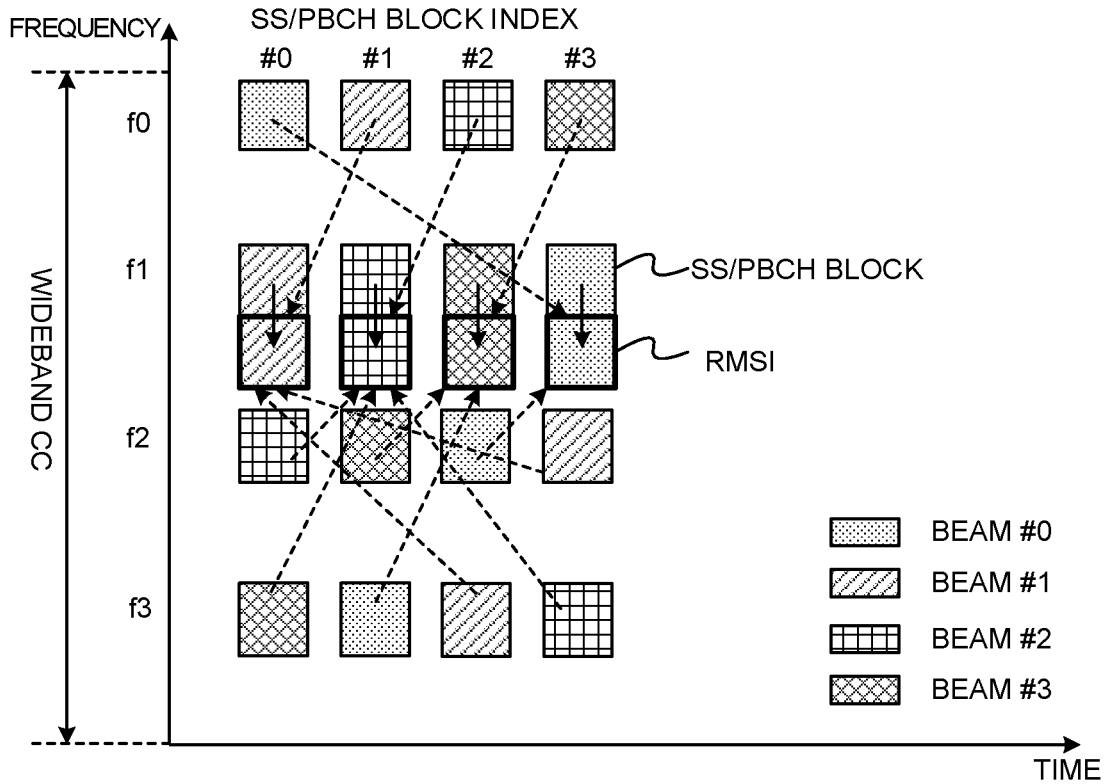
FIGS. 3A and 3B are diagrams illustrating another example of transmission of RMSI.
Figure 3B:
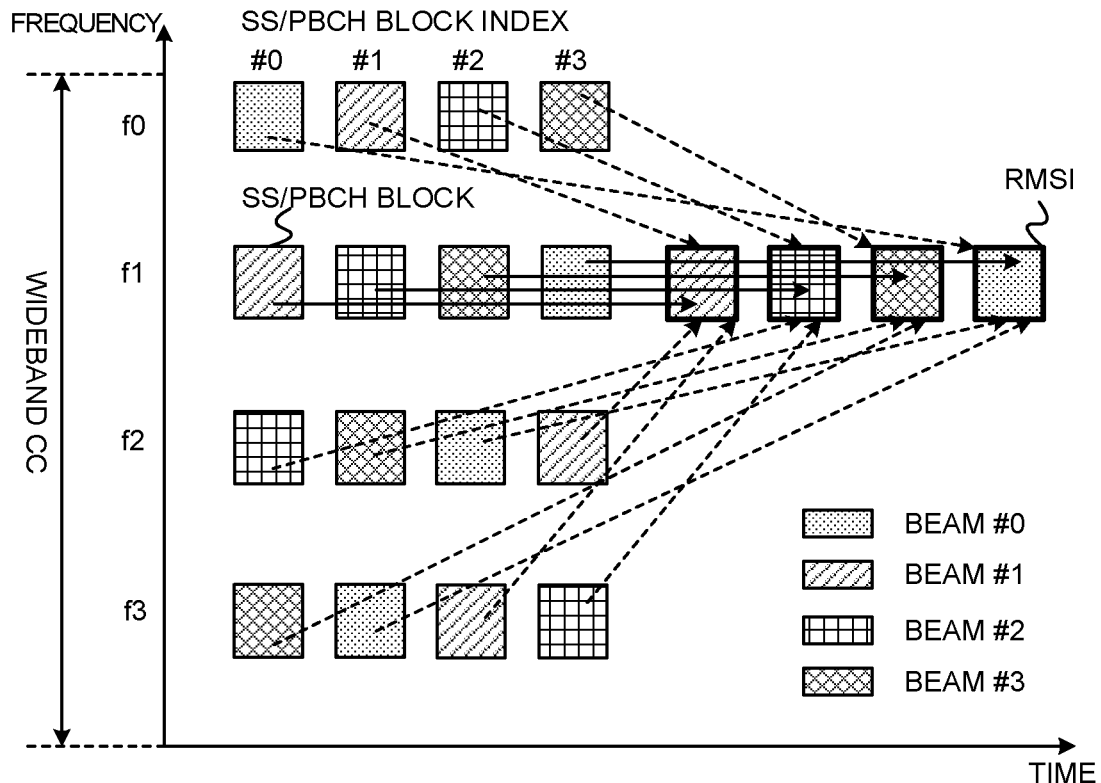

Similar to FIGS. 2A and 2B, in FIGS. 3A and 3B, SS/PBCH bursts including four SS/PBCH blocks are transmitted respectively at the frequencies f0 to f3. In FIGS. 3A and 3B, when one of the SS/PBCH blocks of the frequency f1 associated with the RMSI is detected, the user terminal receives the RMSI based on a PBCH in the detected SS/PBCH block. On the other hand, in a case where SS/PBCH blocks are detected at the frequencies f0, f2 and f3 that are not directly associated with RMSI, a problem is how to notify the user terminal of the RMSI of the frequency f1.

For example, it is assumed that, in FIGS. 3A and 3B, a PBCH in each SS/PBCH block of the frequencies f0, f2 and f3 includes information (e.g., information indicating the frequency f1 and/or information (e.g., SS/PBCH block index) indicating a time of the same beam)) that is necessary to receive RMSI transmitted by using the other frequency f1 by a beam identical to that of each SS/PBCH block. However, there is a risk that an overhead of broadcast information to be conveyed on the PBCH increases.

Alternatively, in FIGS. 3A and 3B, the PBCH in each SS/PBCH block of the frequencies f0, f2 and f3 may include only information indicating that there is not RMSI associated with each SS/PBCH block at the same frequency. In this case, although it is possible to reduce the overhead of the PBCH, the user terminal needs to detect SS/PBCH blocks at the other frequency f1 again, and receive RMSI associated with the SS/PBCH blocks. Therefore, there is a risk that a load of the user terminal increases.

Furthermore, it is assumed that RMSI includes information (RACH configuration information) related to random access per SS/PBCH block. In a case where SS/PBCH blocks of different frequencies are taken into account, there is also a risk that an overhead of RACH configuration information in RMSI increases.

Hence, the inventors of this application have studied a method for shortening a measurement duration that uses SS/PBCH blocks while suppressing an increase in an overhead, and invented the present invention.

One embodiment of the present invention will be described in detail below with reference to the drawings. In the following description, "measurement" may be measurement (intra-frequency measurement) in the same cell (e.g., wideband CC), and/or measurement (inter-frequency measurement) in another cell (e.g., wideband CC).

Furthermore, the following description assumes that the user terminal is a user terminal (the user terminal of the above type 1) that supports the wideband CC as 1 CC. However, as long as the user terminal is a terminal that supports a CC on which SS/PBCH blocks are transmitted at a plurality of frequencies, the user terminal may be any terminal. Furthermore, the wideband CC may include a plurality of CCs used for CA of the user terminal of the above type 2, yet is not limited to this. As long as the wideband CC is a CC on which SS/PBCH blocks are transmitted at a plurality of frequencies, the wideband CC may be any CC. Furthermore, the wideband CC may be referred to simply as a CC or may be referred to as, for example, a cell or a carrier.

(First Aspect)

The first aspect will describe that a user terminal performs measurement using SS/PBCH blocks.

The user terminal may not assume quasi-collocation of at least a space (even in a case of an identical SS/PBCH block index) between a plurality of SS/PBCH blocks of different frequencies (frequency positions) in a wideband CC as default. That is, the user terminal may not assume that a plurality of SS/PBCH blocks of different frequencies (frequency positions) in the wideband CC are transmitted by an identical beam.

Furthermore, the user terminal may not assume quasi-collocation of at least one of an average gain, delay and Doppler parameters in addition to the space between a plurality of SS/PBCH blocks of different frequencies.

Figure 4:
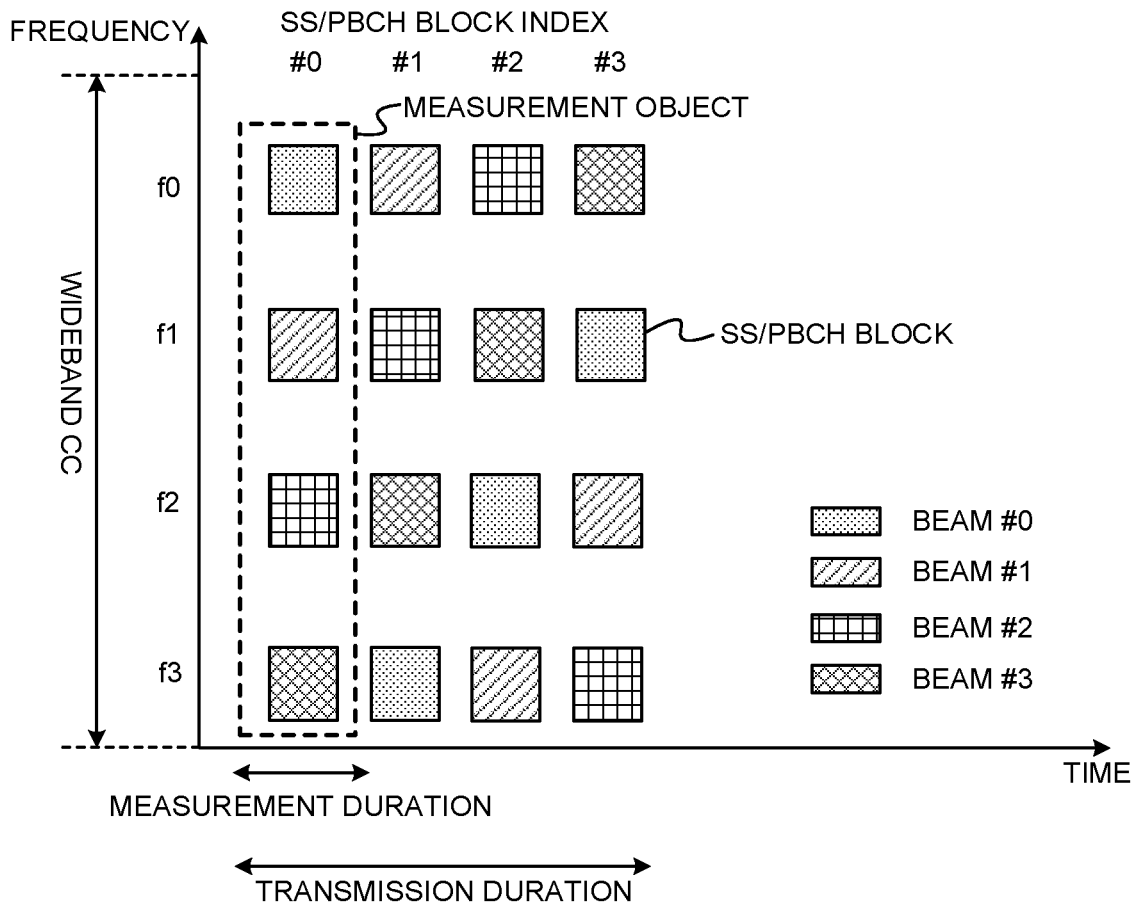
FIG. 4 is a diagram illustrating one example of measurement that uses SS/PBCH blocks according to a first aspect.

FIG. 4 is a diagram illustrating one example of measurement that uses SS/PBCH blocks according to the first aspect. FIG. 4 illustrates an SS/PBCH burst including four SS/PBCH blocks. The SS/PBCH burst is transmitted at each of frequencies f0 to f3 in the wideband CC. Furthermore, in FIG. 4, a radio base station performs beam sweeping according to a different pattern at a different frequency.

Even when a plurality of SS/PBCH blocks of the different frequencies f0 to f3 have an identical SS/PBCH block index (e.g., #0) as illustrated in FIG. 4, a plurality of SS/PBCH blocks can be transmitted by respectively different beams #0 to #3. Therefore, the user terminal does not assume quasi-collocation of at least one of the space, the average gain, the delay and the Doppler parameters between a plurality of SS/PBCH blocks of the different frequencies f0 to f3 as default even in a case of the identical SS/PBCH block index.

Thus, the user terminal does not assume QCL between a plurality of SS/PBCH blocks of the different frequencies f0 to f3 (i.e., the user terminal assumes that a plurality of SS/PBCH blocks of the different frequencies f0 to f3 are transmitted by different beams). Furthermore, even when there is the identical SS/PBCH block index in the wideband CC, the user terminal does not average measurement results of RSRP of SSs (an SSS and/or a PSS).

Furthermore, there may be a case where a network (e.g., radio base station) configures the user terminal to measure SS/PBCH blocks of a plurality of frequencies (f0 to f3 in this case). For example, FIG. 4 assumes that the user terminal receives information for instructing measurement of SS/PBCH blocks of a plurality of frequencies from the radio base station.

<SS/PBCH Block Index>

By the way, the user terminal is assumed to detect SS/PBCH block indices of SS/PBCH blocks based on broadcast information that is conveyed on a PBCH in each SS/PBCH block and a pattern of a DMRS that is multiplexed with the PBCH, or based on only the pattern of the DMRS that is multiplexed with the PBCH.

On the other hand, in a case illustrated in FIG. 4, the user terminal is synchronized even at different frequencies in the same cell (i.e., wideband CC) (the user terminal can assume that a single frame timing, a single slot timing and a single symbol timing are used). Consequently, the user terminal can assume that a plurality of SS/BPCH blocks to be transmitted at an identical timing have the identical SS/PBCH block index.

Consequently, the user terminal may derive SS/PBCH block indices of SS/PBCH blocks of other frequencies based on an SS/PBCH block index detected at a certain frequency in the wideband CC. When, for example, detecting an SS/PBCH block index #1 of the SS/PBCH block of the frequency f0 in FIG. 4, the user terminal may assume that SS/PBCH blocks of the other frequencies f1 to f3 of the same timing have the same SS/PBCH block index #1.

<Measurement Duration>

The user terminal can receive information related to transmission of SS/PBCH blocks from the radio base station, and use this information for rate matching or RRM measurement during data reception. The information may be at least one of, for example, information related to indices of SS/PBCH blocks actually transmitted by the radio base station, information related to the number of SS/PBCH blocks actually transmitted by the radio base station, a start index and an end index of the SS/PBCH blocks actually transmitted by the radio base station, and a periodicity of an SS/PBCH burst set actually transmitted by the radio base station. Consequently, the user terminal can recognize in which duration the SS/PBCH blocks are actually transmitted.

Furthermore, the user terminal receives information (measurement duration information) indicating a measurement duration that uses SS/PBCH blocks from the radio base station. The measurement duration information may be at least one of, for example, a duration of the measurement duration, a periodicity and an offset with respect to a reference timing. The user terminal measures SS/PBCH blocks of a single frequency or a plurality of frequencies in the measurement duration configured based on the measurement duration information.

When the user terminal is configured to measure the SS/PBCH blocks of a plurality of frequencies as illustrated in FIG. 4, the measurement duration may be shorter than a transmission duration of the SS/PBCH blocks. On the other hand, when the user terminal is not configured to measure the SS/PBCH blocks of a plurality of frequencies, the measurement duration may be configured equal to the transmission duration of the SS/PBCH blocks or longer than the transmission duration.

Thus, the radio base station may control the duration of the measurement duration based on capability information (e.g., the above type 1 or type 2) related to a support band of the user terminal.

<Measurement Configuration>

The user terminal receives configuration information (measurement configuration information) related to measurement that uses SS/PBCH blocks from the radio base station. The measurement configuration information indicates, for example, a frequency of an SS/PBCH block that is a measurement object.

When the user terminal is configured to measure SS/PBCH blocks of a plurality of frequencies as illustrated in FIG. 4, a single measurement object includes SS/PBCH blocks of a plurality of frequencies (f0 to f3 in this case). Hence, the measurement configuration information may indicate a plurality of measurement object frequencies.

For example, the measurement configuration information may include information (e.g., values of a plurality of Absolute Radio Frequency Channel Numbers (ARFCN)) indicating each of a plurality of frequencies. Alternatively, the measurement configuration information may include information (e.g., a value of a single ARFCN) indicating one of a plurality of frequencies, and information (e.g., a frequency offset value and the number of measurement object frequencies) indicating a relative position with respect to the one frequency.

Furthermore, a plurality of measurement object frequencies (f0 to f3 in FIG. 4) may be respectively assigned indices (frequency indices). The measurement configuration information may indicate the frequency index assigned to each measurement object frequency.

Furthermore, when the user terminal is configured to measure SS/PBCH blocks of a plurality of frequencies as illustrated in FIG. 4, the user terminal may transmit a single measurement report indicating a measurement result of the SS/PBCH blocks of a plurality of frequencies.

The measurement report may include information (also referred to as, for example, beam information or a beam index) indicating a beam of each of the SS/PBCH blocks of a plurality of frequencies. The beam index may be generated based on the frequency index and the SS/PBCH block index. The beam index may be configured based on the frequency index and the SS/PBCH index or may be an operation value that uses the frequency index and the SS/PBCH index. For example, the beam index may be calculated by using an equation "frequency index*(L−1)+SS/PBCH index (where L may represent a maximum number of SS/PBCH blocks in an SS/PBCH burst set in a frequency range defined by a specification or may represent the number of SS/PBCH blocks that is configured by the base station as information related to transmission of the SS/PBCH blocks and is actually transmitted."

As described above, according to the first aspect, the user terminal may not assume quasi-collocation of at least the space between a plurality of SS/PBCH blocks of different frequencies in the wideband CC as default even in the case of the identical SS/PBCH index (i.e., the user terminal may not assume that a plurality of SS/PBCH blocks are transmitted by an identical beam). Consequently, by changing a beam sweeping pattern per frequency, it is possible to appropriately perform measurement in a short measurement duration compared to a case where a plurality of SS/PBCH blocks of all beams are measured at a single frequency.

(Second Aspect)

The second aspect will describe broadcast information that is transmitted via a PBCH of a different frequency in a wideband CC. The broadcast information includes information (CORESET configuration information) related to a CORESET configuration. The pieces of broadcast information that are transmitted on the PBCH of the different frequencies may include different contents (e.g., CORESET configuration information) even in a case of an identical SS/PBCH block index.

In this regard, the CORESET configuration information may include at least one of, for example, (1) information (CORESET frequency information) indicating a frequency (also referred to as, for example, a frequency position or a frequency resource) at which a CORESET is arranged, (2) information (CORESET time information) indicating a time (also referred to as, for example, a time position or a time resource) at which the CORESET is arranged, (3) information (reference frequency information) indicating a reference frequency, and (4) information (reference time information) indicating a reference time.

(1) The CORESET frequency information is information indicating a relative position of the CORESET with respect to a frequency of a detected SS/PBCH block or the reference frequency, and may be, for example, information indicating a frequency position of the detected SS/PBCH block or a surrounding frequency position of the detected SS/PBCH block. The surrounding frequency position may be selected from one or more candidates defined in advance.

(2) The CORESET time information is information indicating the relative position of the CORESET with respect to a time of the detected SS/PBCH block or a reference time, and may be, for example, information indicating a time position of the detected SS/PBCH block or a surrounding time position of the detected SS/PBCH block. The surrounding time position may be selected from one or more candidates defined in advance. Furthermore, (1) the CORESET frequency information and (2) the CORESET time information may be notified to instruct one of combinations of a plurality of time/frequency candidate positions defined by a specification in advance.

(3) The reference frequency information is, for example, information indicating a frequency (frequency position) at which RMSI (or an SS/PBCH block associated with this RMSI) is transmitted, and may be, for example, the above frequency index, an ARFCN, a raster number or frequency offset information (e.g., the number of PRBs) from the detected SS/PBCH block. In addition, when a given condition is satisfied (when, for example, a band is 6 GHz or more a subcarrier-spacing is 120 kHz or 240 kHz), the reference frequency information may be included in the CORESET configuration information.

(4) The reference time information is, for example, information indicating a time (time position) at which RMSI (or an SS/PBCH block associated with this RMSI) is transmitted, and may be, for example, the above SS/PBCH block index. In addition, when the given condition is satisfied (when, for example, a band in use is 6 GHz or more or a subcarrier-spacing is 120 kHz or 240 kHz), the reference time information may be included in the CORESET configuration information.

Figure 5A:
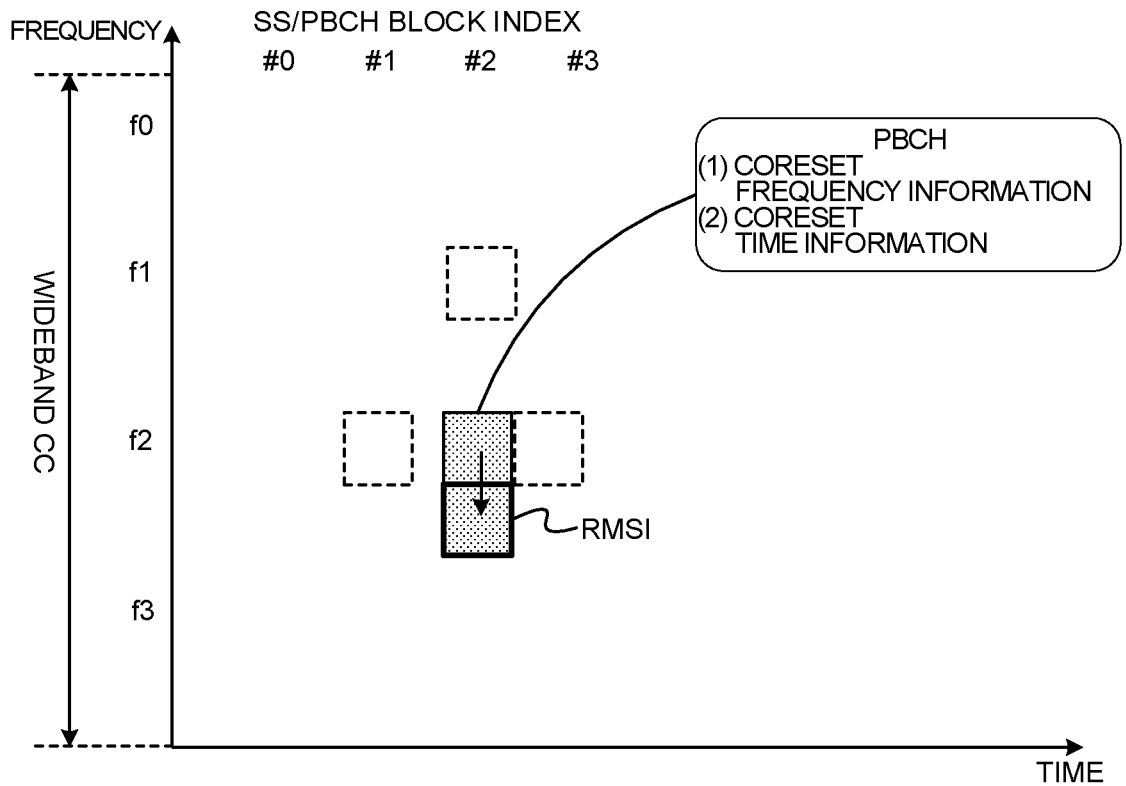
FIGS. 5A and 5B are diagrams illustrating one example of CORESET configuration information according to a second aspect.

FIG. 5 is a diagram illustrating one example of CORESET configuration information according to the second aspect. FIG. 5A assumes that, in a case where an SS/PBCH block of each frequency is associated with RMSI (see FIG. 2A), the user terminal detects an SS/PBCH block of an SS/PBCH block index #2 of a frequency f2. FIG. 5A assumes a case where a band in use and/or a subcarrier-spacing are lower than a given threshold (e.g., a case where the band in use is lower than 6 GHz or the subcarrier-spacing is 15 kHz or 30 kHz).

A PBCH in the detected SS/PBCH block in FIG. 5A may include the above CORESET frequency information and CORESET time information. In, for example, FIG. 5A, one time and/or frequency positions at which the RMSI is arranged are selected from four time and/or frequency candidate positions. The CORESET frequency information may indicate a relative position with respect to the SS/PBCH block of this frequency. The CORESET time information may indicate a relative position with respect to an SS/PBCH block of this time.

Figure 5B:
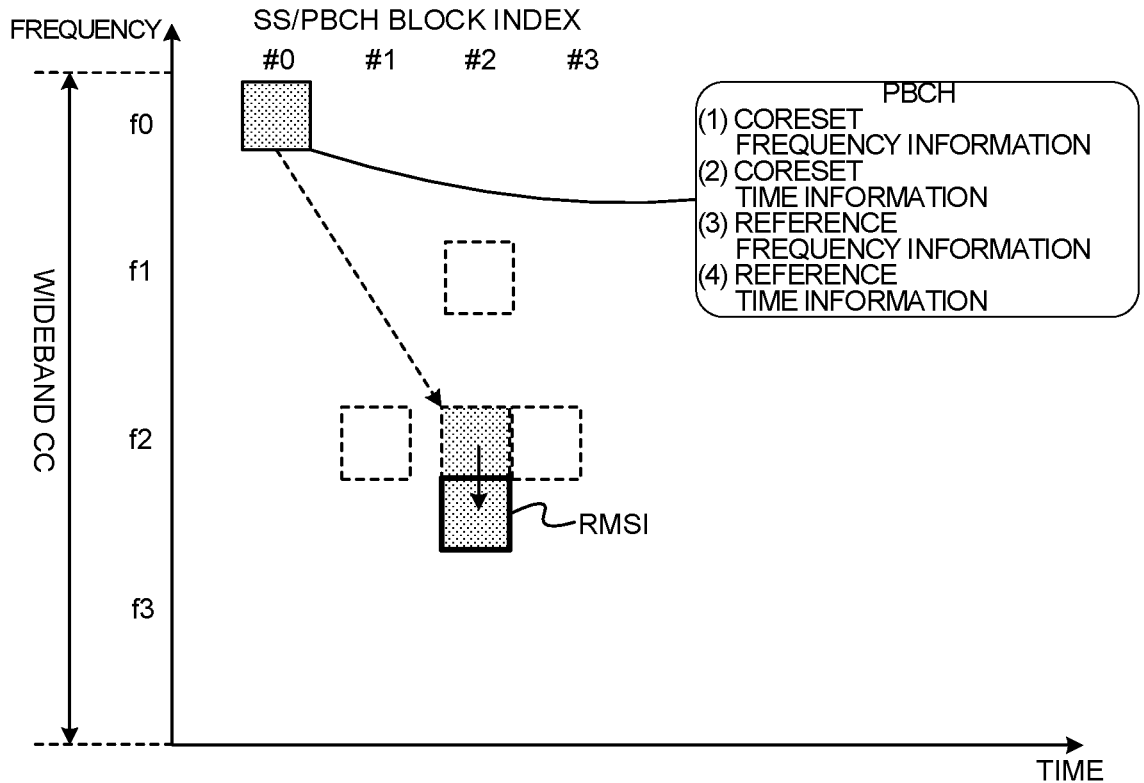

FIG. 5B assumes that, in a case where SS/PBCH blocks of part of frequencies are associated with RMSI (see FIG. 2B), the user terminal detects an SS/PBCH block of an SS/PBCH block index #0 of a frequency f0. FIG. 5B assumes a case where the band in use and/or the subcarrier-spacing are the given threshold or more (e.g., a case where the band in use is higher than 6 GHz or the subcarrier-spacing is 120 kHz or 240 kHz).

The PBCH in the detected SS/PBCH block in FIG. 5B may include the above CORESET frequency information, CORESET time information, reference frequency information and reference time information. For example, in FIG. 5B, the reference frequency information indicates the frequency f2, and the reference time information indicates the SS/PBCH block index #2.

In FIG. 5B, the user terminal recognizes an SS/PBCH block position of the frequency f2 and the SS/PBCH block index #2 based on the reference frequency information and the reference time information, and receives the RMSI based on the relative position information included in the CORESET frequency information and the CORESET time information based on the SS/PBCH block position.

According to the second aspect, the user terminal can appropriately receive RMSI while suppressing an increase in an overhead of a PBCH.

(Third Aspect)

The third aspect will describe RACH configuration information included in RMSI. According to the third aspect, an RACH resource associated with an SS/PBCH block of each SS/PBCH block index of each frequency may be explicitly and/or implicitly notified.

FIG. 6 is a diagram illustrating one example of RACH configuration information according to the third aspect. In this regard, FIG. 6 assumes that SS/PBCH blocks of SS/PBCH block indices #0 to #3 are transmitted at frequencies f0 to f3 in a wideband CC as illustrated in FIG. 4, yet is not limited to this.

As illustrated in FIG. 6A, RACH configuration information per frequency and per SS/PBCH block index may be notified to a user terminal by a higher layer signaling (an RRC signaling or RMSI). Each RACH configuration information may include information (RACH resource information) indicating an arrangement position of the RACH resource associated with an SS/PBCH block of a corresponding frequency and SS/PBCH block index.

Alternatively, as illustrated in FIG. 6B, the RACH configuration information per RACH resource may be notified to the user terminal by the higher layer signaling (the RRC signaling or the RMSI). Each RACH configuration information may include information (SS/PBCH block information) indicating frequencies and/or SS/PBCH block indices of one or more SS/PBCH blocks associated with corresponding RACH resources, and information (RACH resource information) indicating arrangement positions of the RACH resources.

Alternatively, as illustrated in FIG. 6C, RACH configuration information per SS/PBCH index may be notified to the user terminal by the higher layer signaling (the RRC signaling or the RMSI). In this case, each RACH configuration information may include information indicating a relative position in a time direction and/or a frequency direction of an RACH resource with respect to the SS/PBCH block. The user terminal may determine the RACH resource based on the time/frequency positions of the detected SS/PBCH block and the relative position information.

Figure 7A:
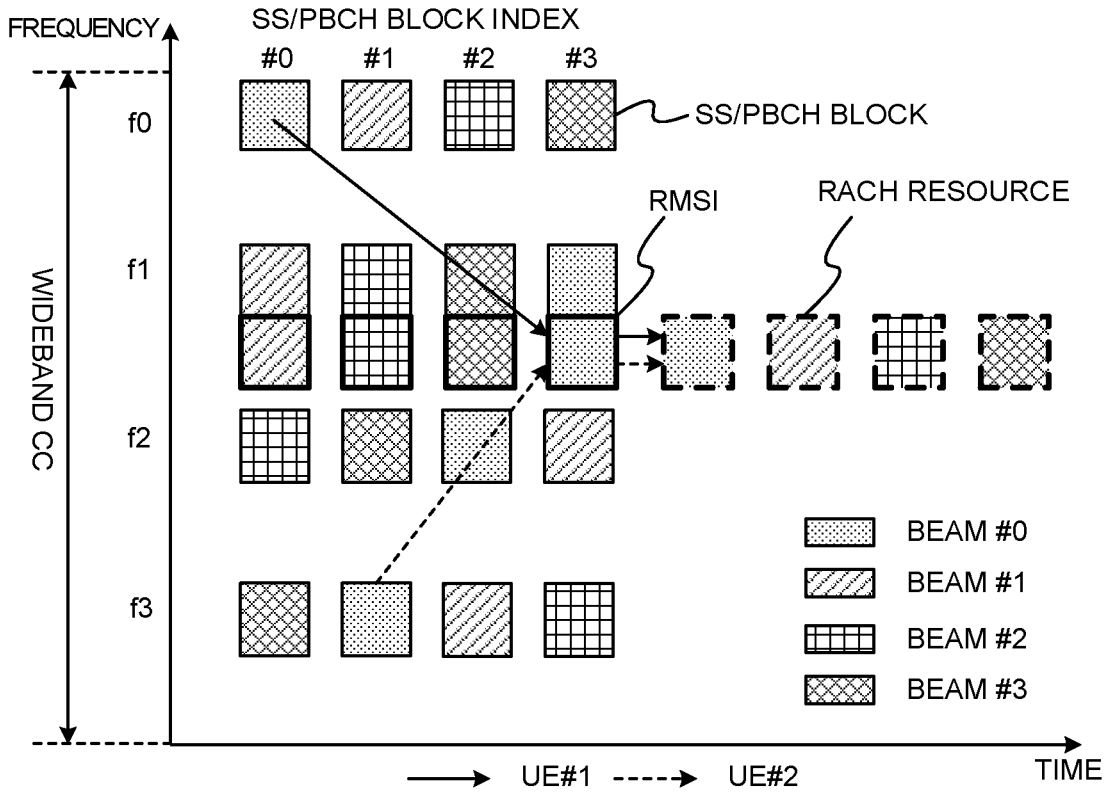
FIGS. 7A and 7B are diagrams illustrating one example of an RACH resource according to the third aspect.
Figure 7B:
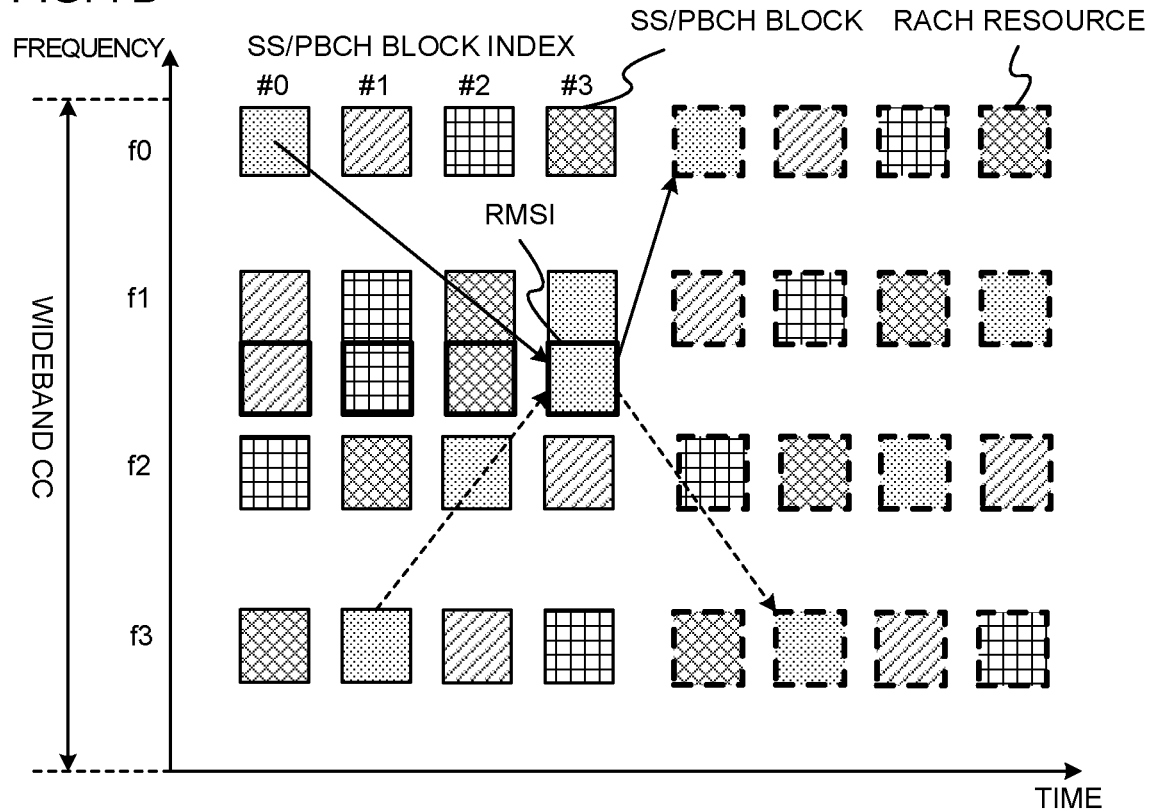

FIGS. 7 and 8 are diagrams illustrating one example of an RACH resource according to the third aspect. FIG. 7 illustrates a case where RMSI associated with each SS/PBCH block of part of frequencies (the frequency f0 in FIGS. 7A and 7B) in the wideband CC is provided. On the other hand, FIG. 8 illustrates a case where RMSI associated with each SS/PBCH block of each frequency in the wideband CC is provided.

Figure 8A:
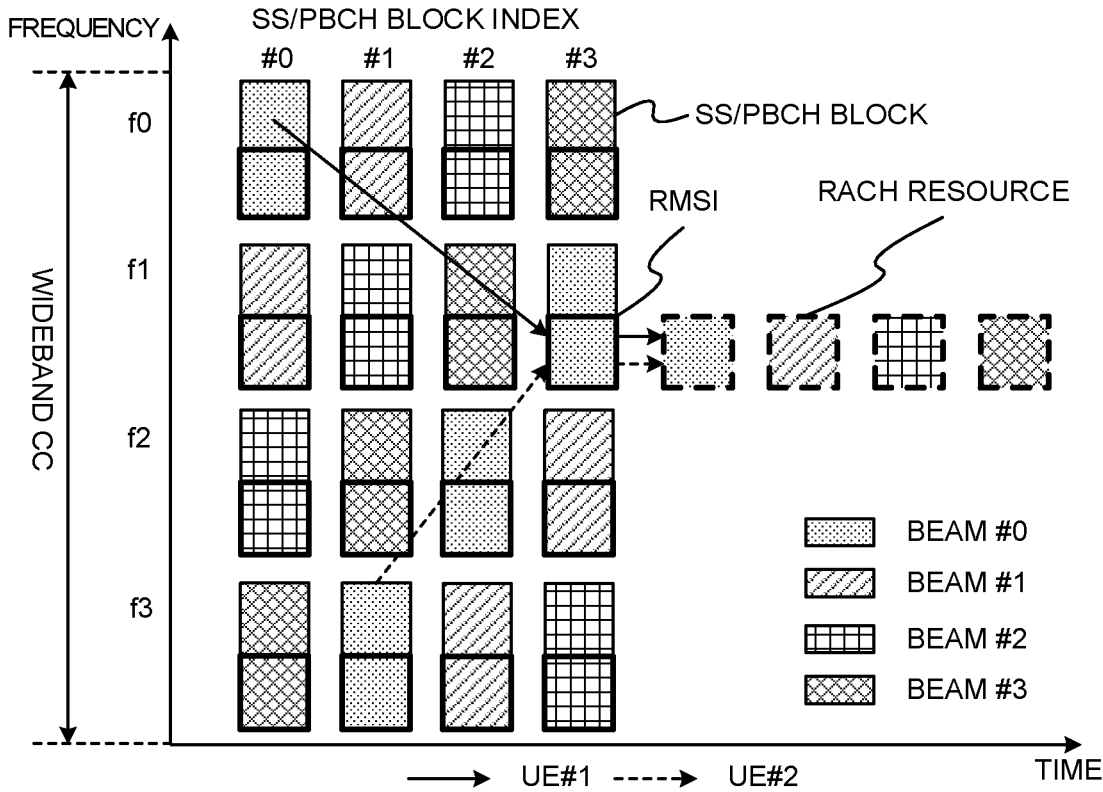
FIGS. 8A and 8B are diagrams illustrating another example of the RACH resource according to the third aspect.

Furthermore, in FIGS. 7A and 8A, the RACH resource associated with each beam is provided for part of frequencies (the frequency f0 in FIGS. 7A and 8A) in the wideband CC. On the other hand, in FIGS. 7B and 8B, the RACH resource associated with each beam is provided for each frequency in the wideband CC.

In, for example, FIG. 7A, when detecting an SS/PBCH block of the SS/PBCH block index #0 at the frequency f0, a user terminal #1 detects RMSI of the SS/PBCH block index #3 of the frequency f1 based on CORESET configuration information in the PBCH. The user terminal #1 detects an RACH resource associated with a beam #0 identical to that of the detected SS/PBCH block based on RACH configuration information in the RMSI. The same also applies to a user terminal #2 that detects an SS/PBCH block of a frequency f3 and the SS/PBCH block index #1.

In FIG. 7B, the RACH resource indicated by the RACH configuration information differs per SS/PBCH block detected by the user terminal. For example, the RACH resource of the frequency f0 is allocated to, for example, the user terminal #1 that detects the SS/PBCH block of the SS/PBCH block index #0 at the frequency f0. On the other hand, the RACH resource of the frequency f3 is allocated to the user terminal #2 that detects the SS/PBCH block of the frequency f3 and the SS/PBCH block index #1.

Figure 8B:
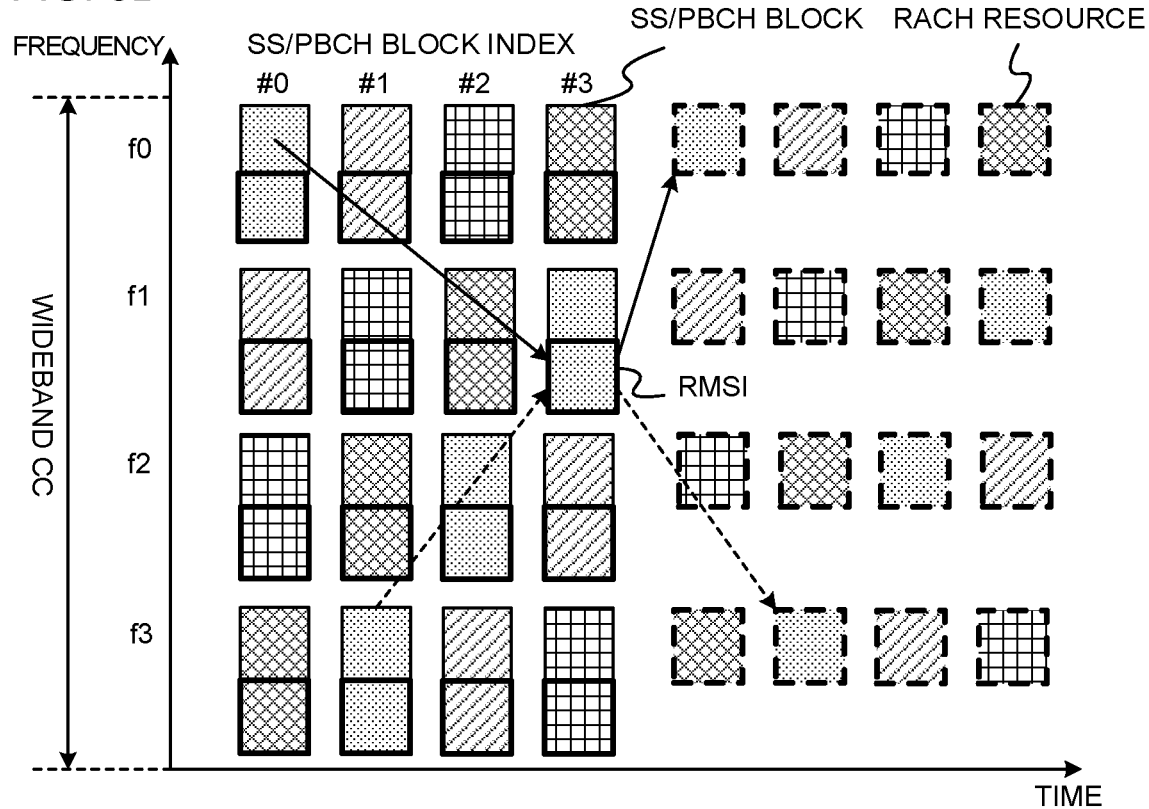

FIGS. 8A and 8B are the same as FIGS. 7A and 7B except that RMSI is provided in association with each SS/PBCH block.

The RACH configuration information illustrated in FIGS. 6A and 6B is applicable to all of FIGS. 7A, 7B, 8A and 8B. On the other hand, the RACH configuration information illustrated in FIG. 6C is applicable to FIGS. 7B and 8B, yet is not applicable to FIGS. 7A and 8A.

According to the third aspect, the user terminal can suppress an increase in an overhead of the RACH configuration information.

(Radio Communication System)

The configuration of the radio communication system according to the present embodiment will be described below. This radio communication system uses one or a combination of each of the above aspects of the present invention to perform communication.

Figure 9:
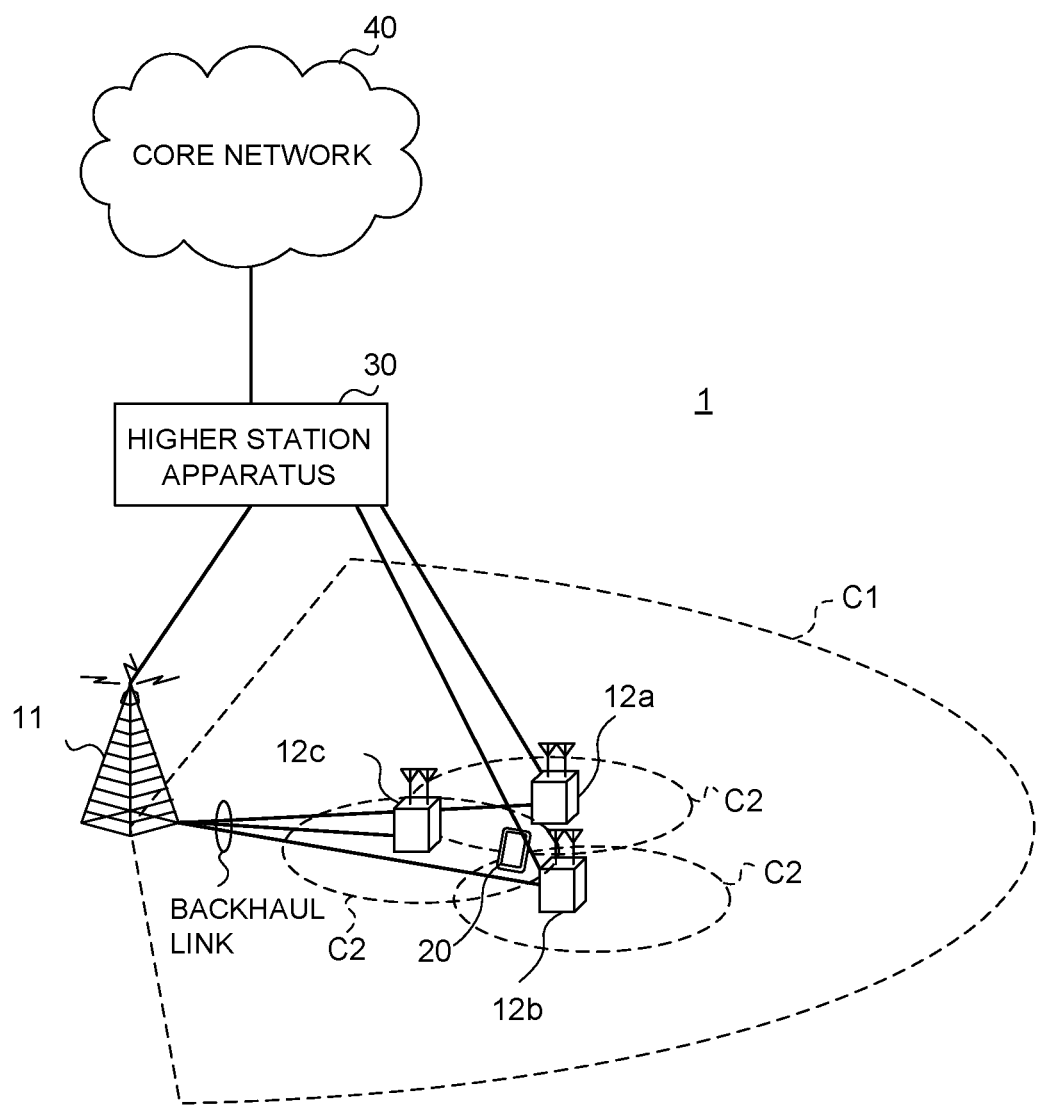
FIG. 9 is a diagram illustrating one example of a schematic configuration of a radio communication system according to the present embodiment.

FIG. 9 is a diagram illustrating one example of a schematic configuration of the radio communication system according to the present embodiment. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT) or NR, or a system that realizes these techniques.

The radio communication system 1 includes a radio base station 11 that forms a macro cell C1 of a relatively wide coverage, and radio base stations 12 (12a to 12c) that are located in the macro cell C1 and form small cells C2 narrower than the macro cell C1. Furthermore, a user terminal 20 is located in the macro cell C1 and each small cell C2.

The user terminal 20 can connect with both of the radio base station 11 and the radio base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more). For example, according to DC, an MeNB (MCG) adopts LTE cells, and an SeNB (SCG) adopts NR/5G-cells to perform communication.

The user terminal 20 and the radio base station 11 can communicate by using a carrier (referred to as a Legacy carrier) of a narrow bandwidth in a relatively low frequency band (e.g., 2 GHz). On the other hand, the user terminal 20 and each radio base station 12 may use a carrier of a wide bandwidth in a relatively high frequency band (e.g., 3.5 GHz or 5 GHz) or may use the same carrier as that used between the user terminal 20 and the radio base station 11. In this regard, a configuration of the frequency band used by each radio base station is not limited to this.

The radio base station 11 and each radio base station 12 (or the two radio base stations 12) can be configured to be connected by way of wired connection (e.g., optical fibers compliant with a Common Public Radio Interface (CPRI) or an X2 interface) or radio connection.

The radio base station 11 and each radio base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Furthermore, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier-Frequency Division Multiple Access (SC-FDMA) to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these, and other radio access schemes may be used.

The radio communication system 1 uses a downlink shared channel (PDSCH: Physical Downlink Shared Channel) shared by each user terminal 20, a broadcast channel (a PBCH: Physical Broadcast Channel or an NR-PBCH) and a downlink L1/L2 control channel as downlink channels. At least one of user data, higher layer control information and System Information Blocks (SIBs) is conveyed on the PDSCH. Furthermore, Master Information Blocks (MIBs) are conveyed on the PBCH. A common control channel for notifying whether or not there is a paging channel is mapped on a downlink L1/L2 control channel (e.g., PDCCH), and data of the paging channel (PCH) is mapped on the PDSCH. A downlink reference signal, an uplink reference signal and a physical downlink synchronization signal are additionally arranged.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and the PUSCH is conveyed on the PDCCH. The number of OFDM symbols used for the PDCCH is conveyed on the PCFICH. Transmission acknowledgement information (also referred to as, for example, retransmission control information, HARQ-ACK or ACK/NACK) of a Hybrid Automatic Repeat reQuest (HARD) for the PUSCH is conveyed on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and/or higher layer control information are conveyed on the PUSCH. Furthermore, downlink radio quality information (CQI: Channel Quality Indicator) and transmission acknowledgement information are conveyed on the PUCCH. A random access preamble for establishing connection with a cell is conveyed on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific Reference Signal). Furthermore, a reference signal to be conveyed is not limited to these.

<Radio Base Station>

Figure 10:
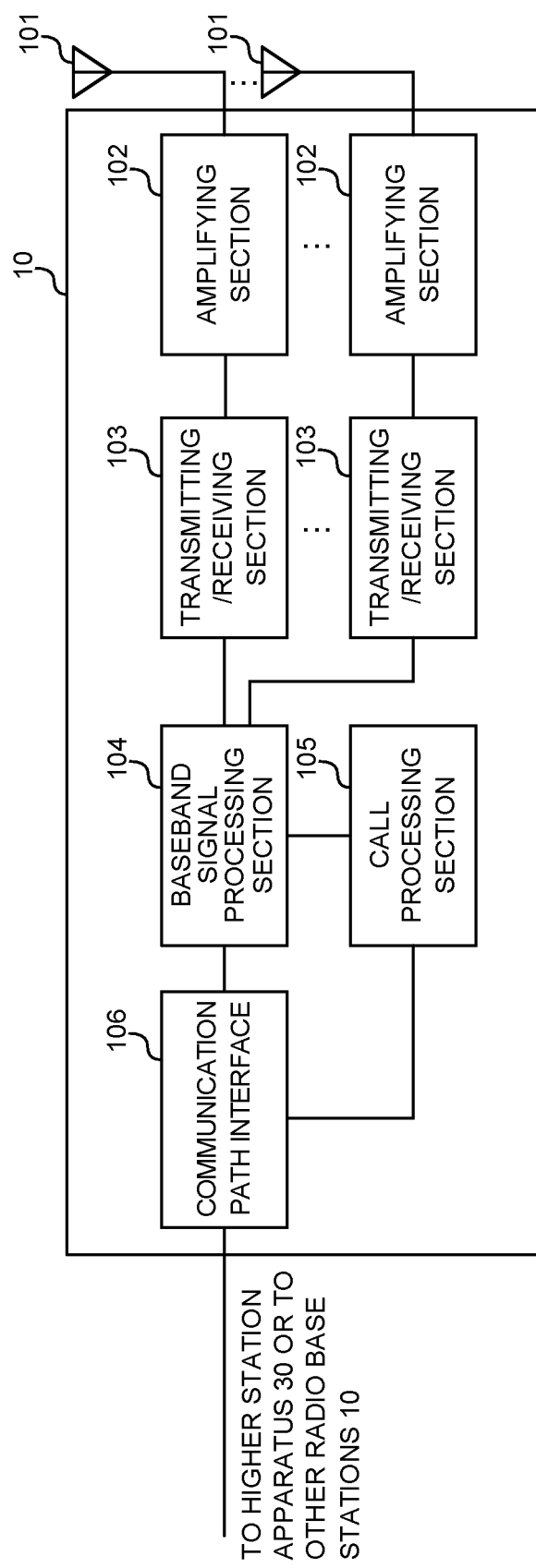
FIG. 10 is a diagram illustrating one example of an overall configuration of a radio base station according to the present embodiment.

FIG. 10 is a diagram illustrating one example of an overall configuration of the radio base station according to the present embodiment. The radio base station 10 includes pluralities of transmission/reception antennas 101, amplifying sections 102 and transmission/reception sections 103, a baseband signal processing section 104, a call processing section 105 and a channel interface 106. In this regard, the radio base station 10 only needs to be configured to include one or more of each of the transmission/reception antennas 101, the amplifying sections 102 and the transmission/reception sections 103.

User data transmitted from the radio base station 10 to the user terminal 20 on downlink is input from the higher station apparatus 30 to the baseband signal processing section 104 via the channel interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmission/reception section 103. Furthermore, the baseband signal processing section 104 performs transmission processing such as channel coding and/or inverse fast Fourier transform on a downlink control signal, too, and transfers the downlink control signal to each transmission/reception section 103.

Each transmission/reception section 103 converts a baseband signal precoded and output per antenna from the baseband signal processing section 104 into a radio frequency range, and transmits a radio frequency signal. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal received by each transmission/reception antenna 101 as an uplink signal. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the channel interface 106. The call processing section 105 performs at least one of call processing such as configuration and release of a communication channel, state management of the radio base station 10, and radio resource management.

The channel interface 106 transmits and receives signals to and from the higher station apparatus 30 via a given interface. Furthermore, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmission/reception section 103 transmits a signal block (SS/PBCH block) including a Synchronization Signal (SS) and a broadcast signal (PBCH). Furthermore, each transmission/reception section 103 transmits at least one of measurement configuration information, SS/PBCH block transmission duration information, measurement duration information, CORESET configuration information and RACH configuration information.

Figure 11:
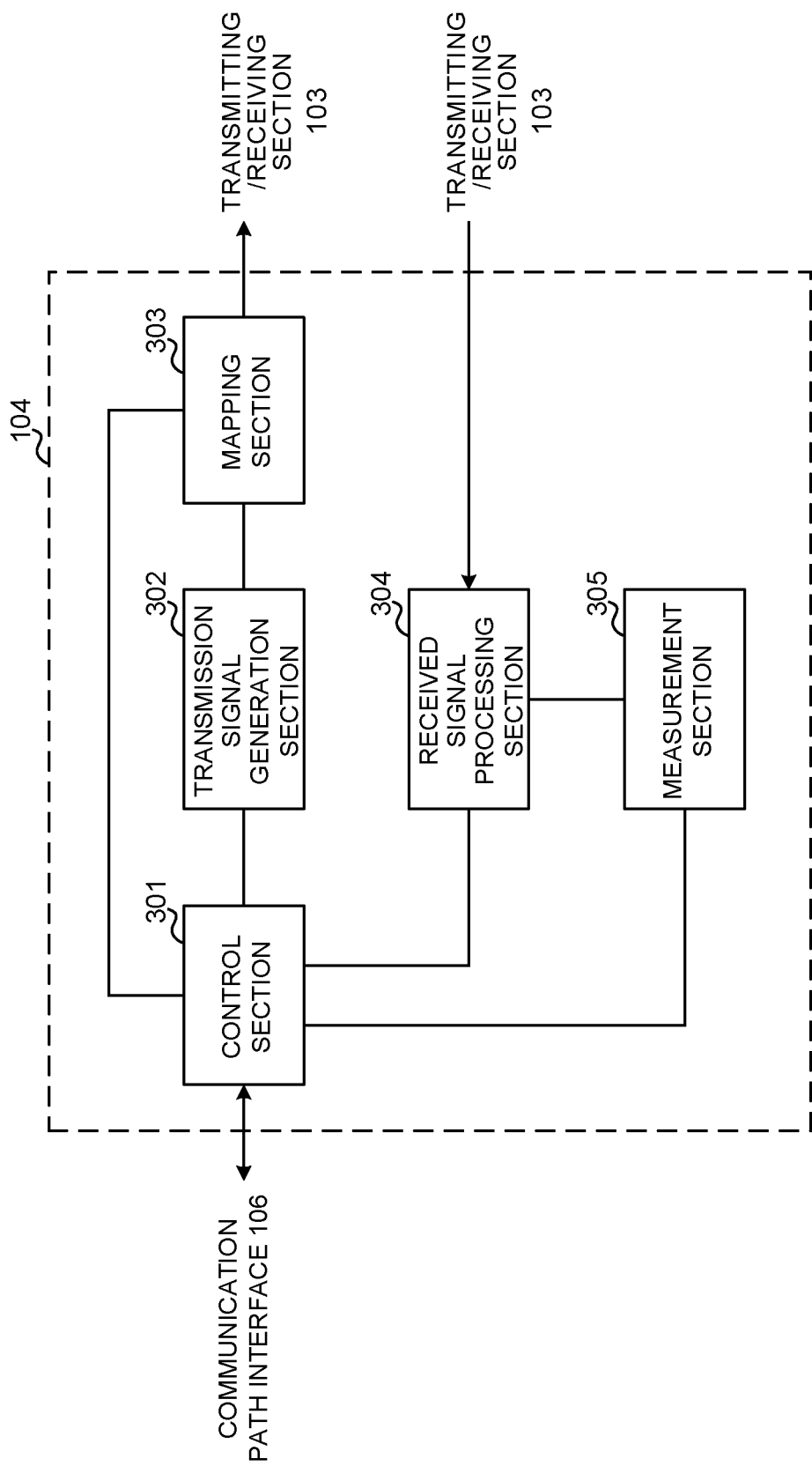
FIG. 11 is a diagram illustrating one example of a function configuration of the radio base station according to the present embodiment.

FIG. 11 is a diagram illustrating one example of a function configuration of the radio base station according to the present embodiment. In addition, this example mainly illustrates function blocks of characteristic portions according to the present embodiment, and assumes that the radio base station 10 includes other function blocks, too, that are necessary for radio communication.

The baseband signal processing section 104 includes at least a control section (scheduler) 301, a transmission signal generating section 302, a mapping section 303, a received signal processing section 304 and a measurement section 305. In addition, these components only need to be included in the radio base station 10, and part or all of the components may not be included in the baseband signal processing section 104. The baseband signal processing section 104 includes a digital beam forming function that provides digital beam forming.

The control section (scheduler) 301 controls the entire radio base station 10. The control section 301 can be composed of a controller, a control circuit or a control apparatus described based on the common knowledge in the technical field according to the present invention.

The control section 301 controls at least one of, for example, signal (including a signal corresponding to at least one of a synchronization signal, RMSI, an MIB, a paging channel, system information and a broadcast channel (broadcast signal)) generation of the transmission signal generating section 302, and signal allocation of the mapping section 303.

The control section 301 controls generation and transmission of the signal block (SS/PBCH block) including the Synchronization Signal (SS) and the broadcast signal (PBCH). Furthermore, the control section 301 controls generation and/or mapping of a sequence of a DMRS (DMRS sequence) multiplexed on a symbol for the PBCH.

Furthermore, the control section 301 controls generation and transmission of the transmission duration information indicating a transmission duration of SS/PBCH blocks.

Furthermore, the control section 301 controls generation and transmission of the measurement configuration information indicating a measurement configuration of the user terminal 20. The measurement configuration information may indicate one or more measurement object frequencies. Furthermore, the control section 301 may control generation and transmission of instruction information indicating whether or not to measure a plurality of frequencies in a wideband CC. Furthermore, the control section 301 controls generation and transmission of the measurement duration information indicating a measurement duration in the user terminal 20.

Furthermore, the control section 301 may control generation and transmission of the CORESET configuration information and/or the RACH configuration information.

The transmission signal generating section 302 generates a downlink signal (at least one of a downlink control signal, a downlink data signal, a downlink reference signal and an SS/PBCH block) based on an instruction from the control section 301, and outputs the downlink signal to the mapping section 303. The transmission signal generating section 302 can be composed of a signal generator, a signal generating circuit or a signal generating apparatus described based on the common knowledge in the technical field according to the present invention.

The transmission signal generating section 302 generates, for example, a DL assignment for notifying downlink signal allocation information, and a UL grant for notifying uplink signal allocation information based on the instruction from the control section 301. Furthermore, the transmission signal generating section 302 performs encoding processing and modulation processing on a downlink data signal according to a code rate and a modulation scheme determined based on Channel State Information (CSI) from each user terminal 20.

The mapping section 303 maps the downlink signal generated by the transmission signal generating section 302, on given radio resources based on the instruction from the control section 301, and outputs the downlink signal to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ) or a Signal to Interference plus Noise Ratio (SINR)) and/or a channel state of the received signal. The measurement section 305 may output a measurement result to the control section 301.

<User Terminal>

Figure 12:
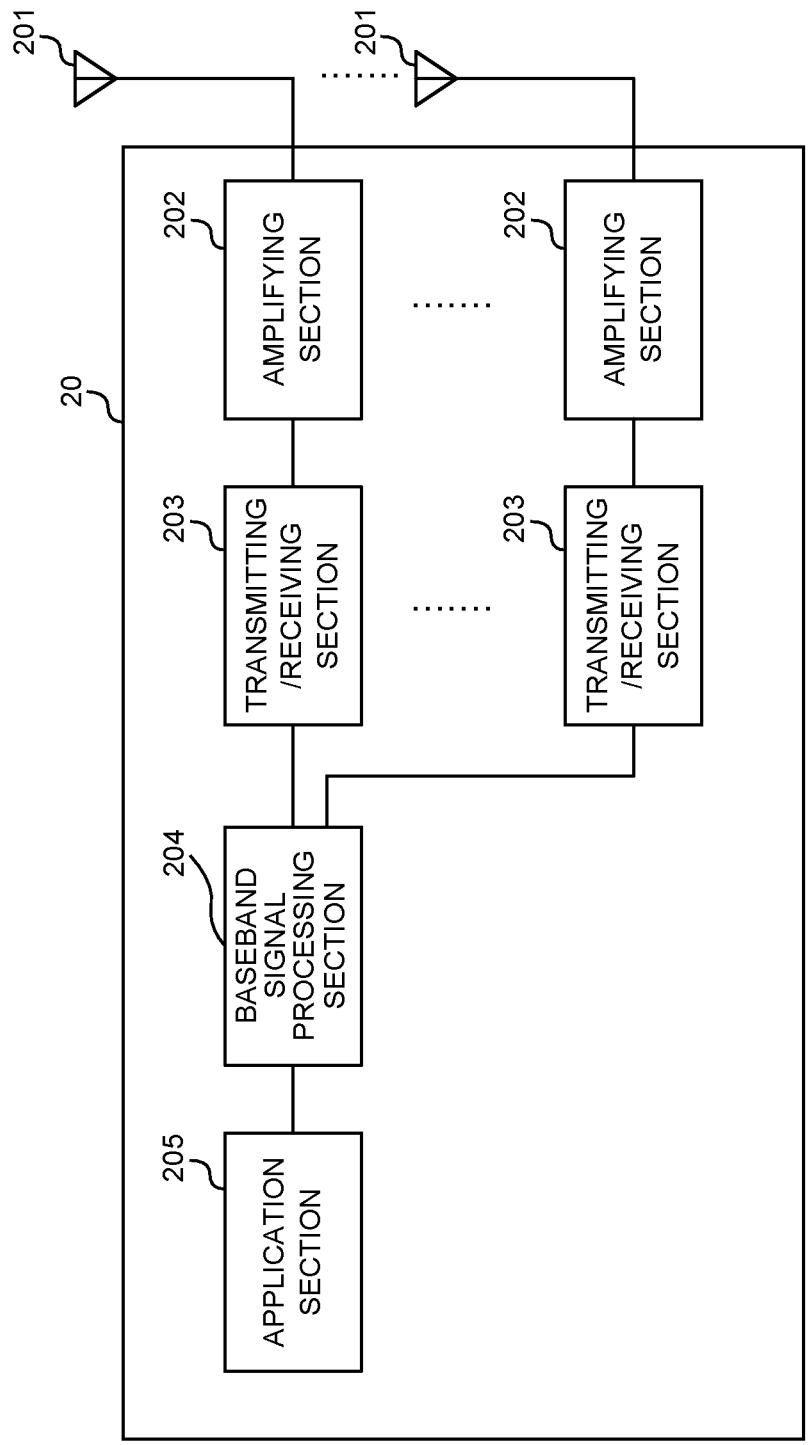
FIG. 12 is a diagram illustrating one example of an overall configuration of a user terminal according to the present embodiment.

FIG. 12 is a diagram illustrating one example of an overall configuration of the user terminal according to the present embodiment. The user terminal 20 includes pluralities of transmission/reception antennas 201, amplifying sections 202 and transmission/reception sections 203, a baseband signal processing section 204 and an application section 205. In this regard, the user terminal 20 only needs to be configured to include one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs at least one of FFT processing, error correcting decoding, and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmission/reception section 203. Each transmission/reception section 203 converts the baseband signal output from the baseband signal processing section 204 into a radio frequency range, and transmits a radio frequency signal. The radio frequency signal subjected to the frequency conversion by each transmission/reception section 203 is amplified by each amplifying section 202, and is transmitted from each transmission/reception antenna 201.

In addition, each transmission/reception section 203 may further include an analog beam forming section that performs analog beam forming. The analog beam forming section can be composed of an analog beam forming circuit (e.g., a phase shifter or a phase shift circuit) or an analog beam forming apparatus (e.g., a phase shifter) described based on the common knowledge in the technical field according to the present invention. Furthermore, each transmission/reception antenna 201 can be composed of an array antenna, for example.

Furthermore, each transmission/reception section 203 receives the signal block (SS/PBCH block) including the Synchronization Signal (SS) and the broadcast signal (PBCH). Furthermore, each transmission/reception section 203 receives at least one of the measurement configuration information, the SS/PBCH block transmission duration information, the measurement duration information, the CORESET configuration information and the RACH configuration information.

Figure 13:
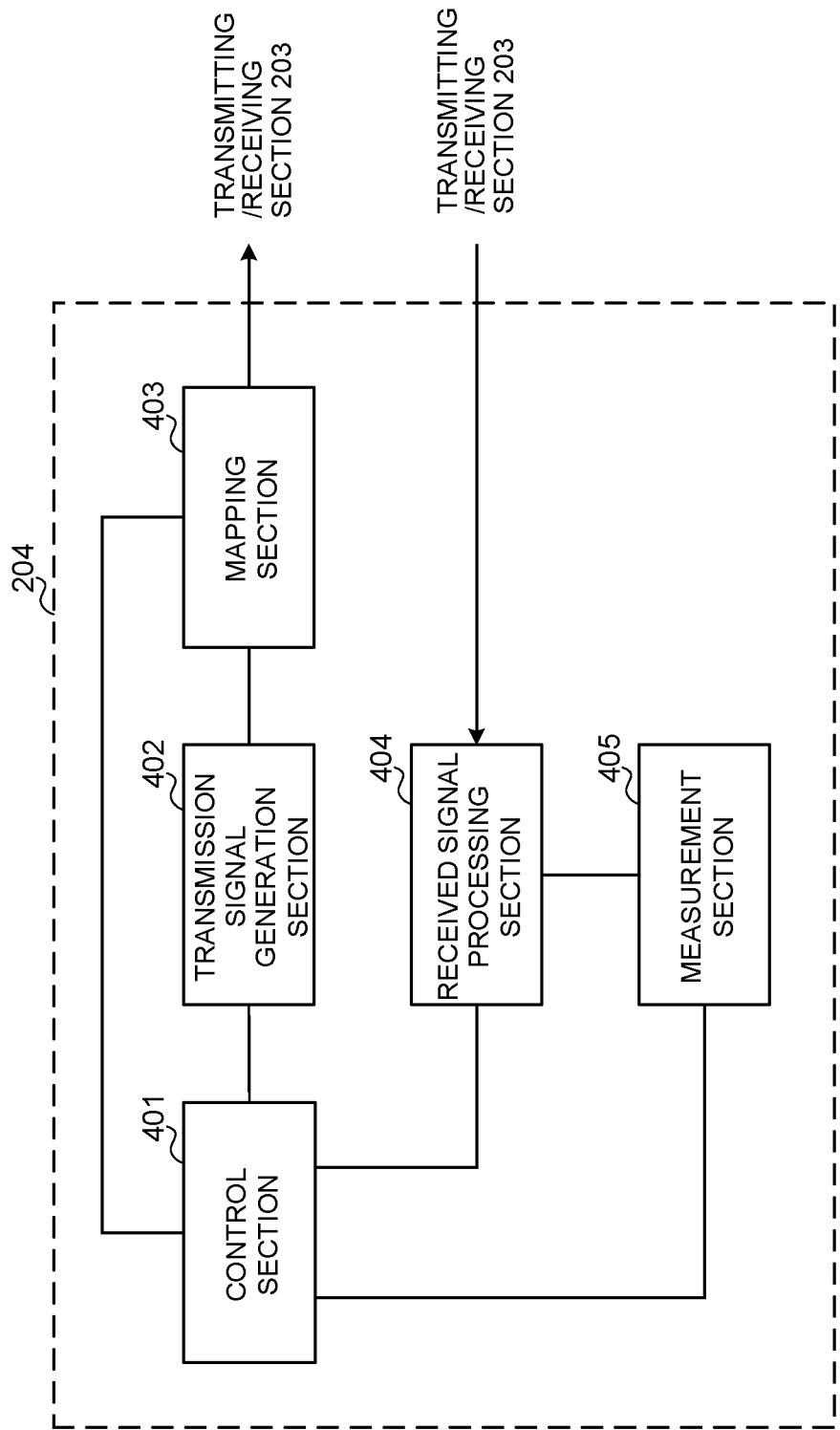
FIG. 13 is a diagram illustrating one example of a function configuration of the user terminal according to the present embodiment.
Figure 14:
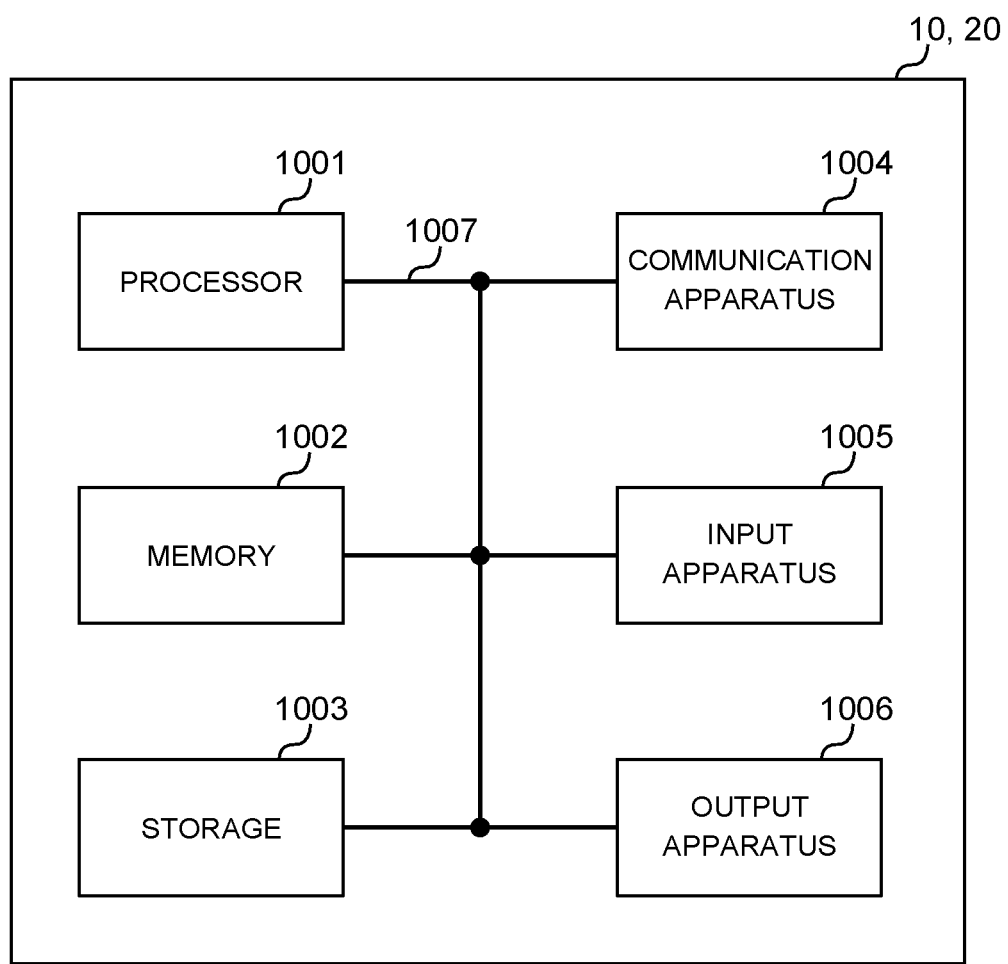
FIG. 14 is a diagram illustrating one example of hardware configurations of the radio base station and the user terminal according to the present embodiment.

FIG. 13 is a diagram illustrating one example of a function configuration of the user terminal according to the present embodiment. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generating section 402, a mapping section 403, a received signal processing section 404 and a measurement section 405. In addition, these components only need to be included in the user terminal 20, and part or all of the components do not necessarily need to be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Furthermore, the control section 401 controls signal reception processing of the received signal processing section 404 and signal measurement of the measurement section 405.

The control section 401 performs control to receive SS/PBCH blocks in a given frequency band or more. Furthermore, the control section 401 may control reception of the synchronization signal block assuming that the synchronization signal block is arranged in a given domain of a slot.

Furthermore, the control section 401 controls measurement of one or more serving cells and/or one or more surrounding cells. More specifically, the control section 401 may control measurement of the serving cells in the measurement duration of a given periodicity based on the SS/PBCH block transmission information indicating SS/PBCH blocks transmitted by the serving cells (first aspect).

Furthermore, the control section 401 controls measurement based on the measurement configuration information. More specifically, when SS/PBCH blocks are transmitted at each of a plurality of frequencies in a single CC, the control section 401 controls measurement at a plurality of frequencies (first aspect).

Furthermore, even when indices of a plurality of SS/PBCH blocks (SS/PBCH block indices) are identical, the control section 401 does not assume quasi-collocation of at least a space between a plurality of SS/PBCH blocks as default (first aspect).

Furthermore, the control section 401 controls a configuration of the measurement duration based on the measurement duration information (first aspect). Furthermore, the control section 401 controls a configuration of the SS/PBCH block transmission duration based on the transmission duration information. In a case where measurement of a plurality of frequencies in the wideband CC is configured, the measurement duration may be shorter than the SS/PBCH block transmission duration.

Furthermore, the control section 401 may control monitoring of candidate resources (search spaces) in a CORESET based on the CORESET configuration information conveyed on a detected PBCH (second aspect). Furthermore, the control section 401 may control reception of the system information (RMSI) via a PDSCH based on DCI detected by the monitoring.

The CORESET configuration information may include at least one of, for example, information (CORESET frequency information) indicating a frequency at which a resource set for the PDCCH is arranged, information (CORESET time information) indicating a time at which the resource set is arranged, information (reference frequency information) indicating the reference frequency, and information (reference time information) indicating the reference time.

Furthermore, the control section 401 may control a configuration of an RACH resource based on RACH configuration information (third aspect). The RACH configuration information may be included in the above system information (RMSI) or may be notified by a higher layer signaling. The RACH configuration information may indicate an RACH resource (a random access resource) associated with each of a plurality of SS/PBCH blocks, may indicate a signal block associated with an RACH resource at each of a plurality of frequencies, or may indicate an RACH resource associated with a signal block index.

The transmission signal generating section 402 generates an uplink signal (such as an uplink control signal, an uplink data signal and an uplink reference signal) based on an instruction from the control section 401, and outputs the uplink signal to the mapping section 403. The transmission signal generating section 402 can be composed of a signal generator, a signal generating circuit or a signal generating apparatus described based on the common knowledge in the technical field according to the present invention.

The transmission signal generating section 402 generates an uplink control signal related to transmission acknowledgement information and/or Channel State Information (CSI) based on, for example, the instruction from the control section 401. Furthermore, the transmission signal generating section 402 generates an uplink data signal based on the instruction from the control section 401. When, for example, the downlink control signal notified from the radio base station 10 includes a UL grant, the transmission signal generating section 402 is instructed by the control section 401 to generate an uplink data signal.

The mapping section 403 maps the uplink signal generated by the transmission signal generating section 402, on radio resources based on the instruction from the control section 401, and outputs the uplink signal to each transmission/reception section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a downlink signal (such as a downlink control signal, a downlink data signal and a downlink reference signal) transmitted from the radio base station 10. The received signal processing section 404 can be composed of a signal processor, a signal processing circuit or a signal processing apparatus described based on the common knowledge in the technical field according to the present invention. Furthermore, the received signal processing section 404 can compose the reception section according to the present invention.

The received signal processing section 404 receives the synchronization signal and the broadcast channel transmitted by the radio base station by applying beam forming based on an instruction from the control section 401. Particularly, the received signal processing section 404 receives the synchronization signal and the broadcast channel allocated to at least one of a plurality of time-domains (e.g., symbols) that compose a given transmission time interval (e.g., a subframe or a slot).

The received signal processing section 404 outputs information decoded by reception processing to the control section 401. The received signal processing section 404 outputs, for example, broadcast information, system information, an RRC signaling and DCI to the control section 401. Furthermore, the received signal processing section 404 outputs a received signal and a signal after the reception processing to the measurement section 405.

The measurement section 405 performs measurement related to the received signal. For example, the measurement section 405 may measure one or more serving cells and/or one or more surrounding cells by using the SS/PBCH blocks transmitted from the radio base station 10. The measurement section 405 can be composed of a measurement instrument, a measurement circuit or a measurement apparatus described based on the common knowledge in the technical field according to the present invention.

The measurement section 405 may measure, for example, received power (e.g., RSRP), received quality (e.g., RSRQ or a received SINR) and/or a channel state by using the received SS/PBCH blocks. The measurement section 405 may output a measurement result to the control section 401. For example, the measurement section 405 performs RRM measurement that uses a synchronization signal.

<Hardware Configuration>

In addition, the block diagrams used to describe the above embodiment illustrate blocks in function units. These function blocks (components) are realized by an optional combination of hardware and/or software. Furthermore, a method for realizing each function block is not limited in particular. That is, each function block may be realized by using one physically and/or logically coupled apparatus or may be realized by using a plurality of these apparatuses formed by connecting two or more physically and/or logically separate apparatuses directly and/or indirectly (by using, for example, wired connection and/or radio connection).

For example, the radio base station and the user terminal according to one embodiment of the present invention may function as computers that perform processing of the radio communication method according to the present invention. FIG. 9 is a diagram illustrating one example of the hardware configurations of the radio base station and the user terminal according to the one embodiment of the present invention. The above-described radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 9 or may be configured without including part of the apparatuses.

For example, FIG. 9 illustrates the only one processor 1001. However, there may be a plurality of processors. Furthermore, processing may be executed by 1 processor or processing may be executed by 1 or more processors concurrently, successively or by using another method. In addition, the processor 1001 may be implemented by 1 or more chips.

Each function of the radio base station 10 and the user terminal 20 is realized by, for example, causing hardware such as the processor 1001 and the memory 1002 to read given software (program), and thereby causing the processor 1001 to perform an operation, and control communication via the communication apparatus 1004 and reading and/or writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from the storage 1003 and/or the communication apparatus 1004 out to the memory 1002, and executes various types of processing according to these programs, software module or data. As the programs, programs that cause the computer to execute at least part of the operations described in the above embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present invention.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via wired and/or radio networks, and will be also referred to as, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the above-described transmission/reception antennas 101 (201), amplifying sections 102 (202), transmission/reception sections 103 (203) and channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using a bus that differs per apparatus.

Furthermore, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or all of each function block. For example, the processor 1001 may be implemented by using at least one of these types of hardware.

MODIFIED EXAMPLE

In addition, each term that has been described in this description and/or each term that is necessary to understand this description may be replaced with terms having identical or similar meanings. For example, a channel and/or a symbol may be signals (signalings). Furthermore, a signal may be a message. A reference signal can be also abbreviated as an RS (Reference Signal), or may be also referred to as a pilot or a pilot signal depending on standards to be applied. Furthermore, a Component Carrier (CC) may be referred to as a cell, a frequency carrier and a carrier frequency.

Furthermore, a radio frame may include one or a plurality of durations (frames) in a time-domain. Each of one or a plurality of durations (frames) that composes a radio frame may be referred to as a subframe. Furthermore, the subframe may include one or a plurality of slots in the time-domain. The subframe may be a fixed time duration (e.g., 1 ms) that does not depend on the numerologies.

Furthermore, the slot may include one or a plurality of symbols (Orthogonal Frequency Division Multiplexing (OFDM) symbols or Single Carrier-Frequency Division Multiple Access (SC-FDMA) symbols) in the time-domain. Furthermore, the slot may be a time unit based on the numerologies. Furthermore, the slot may include a plurality of mini slots. Each mini slot may include one or a plurality of symbols in the time-domain. Furthermore, the mini slot may be referred to as a sub slot.

The radio frame, the subframe, the slot, the mini slot and the symbol each indicate a time unit for conveying signals. The other corresponding names may be used for the radio frame, the subframe, the slot, the mini slot and the symbol. For example, 1 subframe may be referred to as a Transmission Time Interval (TTI), a plurality of contiguous subframes may be referred to as TTIs, or 1 slot or 1 mini slot may be referred to as a TTI. That is, the subframe and/or the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling for radio communication. For example, in the LTE system, the radio base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block and/or codeword, or may be a processing unit of scheduling or link adaptation. In addition, when the TTI is given, a time period (e.g., the number of symbols) in which a transport block, a code block and/or a codeword are actually mapped may be shorter than the TTI.

In addition, when 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that compose a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe or a long subframe. A TTI shorter than the general TTI may be referred to as a reduced TTI, a short TTI, a partial or fractional TTI, a reduced subframe, a short subframe, a mini slot or a subslot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

Resource Blocks (RBs) are resource allocation units of the time-domain and the frequency-domain, and may include one or a plurality of contiguous subcarriers in the frequency-domain. Furthermore, the RB may include one or a plurality of symbols in the time-domain or may have the length of 1 slot, 1 mini slot, 1 subframe or 1 TTI. 1 TTI or 1 subframe may each include one or a plurality of resource blocks. In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and parameters described in this description may be expressed by using absolute values, may be expressed by using relative values with respect to given values or may be expressed by using other corresponding information. For example, a radio resource may be instructed by a given index.

Names used for parameters in this description are in no respect restrictive names. For example, various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in this description may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or optional combinations of these.

Furthermore, the information and the signals can be output from a higher layer to a lower layer and/or from the lower layer to the higher layer. The information and the signals may be input and output via a plurality of network nodes.

The input and output information and signals may be stored in a specific location (e.g., memory) or may be managed by using a management table. The information and signals to be input and output can be overwritten, updated or additionally written. The output information and signals may be deleted. The input information and signals may be transmitted to other apparatuses.

Notification of information is not limited to the aspects/embodiment described in this description and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (Master Information Blocks (MIBs) and System Information Blocks (SIBs)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be performed implicitly (by, for example, not notifying this given information or by notifying another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using wired techniques (e.g., coaxial cables, optical fiber cables, twisted pairs and Digital Subscriber Lines (DSLs)) and/or radio techniques (e.g., infrared rays and microwaves), these wired techniques and/or radio techniques are included in a definition of the transmission media.

The terms "system" and "network" used in this description can be compatibly used.

In this description, the terms "Base Station (BS)", "radio base station", "eNB", "gNB", "cell", "sector", "cell group", "carrier" and "component carrier" can be compatibly used. The base station will be also referred to as a term such as a fixed station, a NodeB, an eNodeB (eNB), an access point, a transmission point, a reception point, a transmission/reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each smaller area can also provide communication service via a base station subsystem (e.g., indoor small base station (RRH: Remote Radio Head)). The term "cell" or "sector" indicates part or the entirety of the coverage area of the base station and/or the base station subsystem that provide communication service in this coverage.

In this description, the terms "Mobile Station (MS)", "user terminal", "User Equipment (UE)" and "terminal" can be compatibly used.

The mobile station will be also referred to by a person skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

The base station and/or the mobile station may be referred to as a transmission apparatus or a reception apparatus.

Furthermore, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the above-described radio base station 10. Furthermore, words such as "uplink" and "downlink" may be read as a "side". For example, the uplink channel may be read as a side channel.

Similarly, the user terminal in this description may be read as the radio base station. In this case, the radio base station 10 may be configured to include the functions of the above-described user terminal 20.

In this description, operations performed by the base station are performed by an upper node of this base station depending on cases. Obviously, in a network including one or a plurality of network nodes including the base stations, various operations performed to communicate with a terminal can be performed by base stations, one or more network nodes (that are supposed to be, for example, Mobility Management Entities (MMEs) or Serving-Gateways (S-GWs) yet are not limited to these) other than the base stations or a combination of these.

Each aspect/embodiment described in this description may be used alone, may be used in combination or may be switched and used when carried out. Furthermore, orders of the processing procedures, the sequences and the flowchart according to each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are expanded based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity or the order of these elements. These names can be used in this description as a convenient method for distinguishing between two or more elements. Hence, the reference to the first and second elements does not mean that only two elements can be employed or the first element should precede the second element in some way.

The term "deciding (determining)" used in this description includes diverse operations in some cases. For example, "deciding (determining)" may be regarded to "decide (determine)" calculating, computing, processing, deriving, investigating, looking up (e.g., looking up in a table, a database or another data structure) and ascertaining. Furthermore, "deciding (determining)" may be regarded to "decide (determine)" receiving (e.g., receiving information), transmitting (e.g., transmitting information), input, output and accessing (e.g., accessing data in a memory). Furthermore, "deciding (determining)" may be regarded to "decide (determine)" resolving, selecting, choosing, establishing and comparing. That is, "deciding (determining)" may be regarded to "decide (determine)" some operation.

The words "connected" and "coupled" used in this description or every modification of these words can mean every direct or indirect connection or coupling between 2 or more elements, and can include that 1 or more intermediate elements exist between the two elements "connected" or "coupled" with each other. The elements may be coupled or connected physically, logically or by a combination of the physical and logical connections. For example, "connection" may be read as "access".

It can be understood that, when connected in this description, the two elements are "connected" or "coupled" with each other by using 1 or more electric wires, cables and/or printed electrical connection, and by using electromagnetic energy having wavelengths in radio frequency domains, microwave domains and/or (both of visible and invisible) light domains in some non-restrictive and non-comprehensive examples.

A sentence that "A and B are different" in this description may mean that "A and B are different from each other". Words such as "separate" and "coupled" may be also interpreted in a similar manner.

When the words "including" and "comprising" and modifications of these words are used in this description or the claims, these words intend to be comprehensive similar to the word "having". Furthermore, the word "or" used in this description or the claims intends not to be an XOR.

The present invention has been described in detail above. However, it is obvious for a person skilled in the art that the present invention is not limited to the embodiment described in this description. The present invention can be carried out as modified and changed aspects without departing from the gist and the scope of the present invention defined based on the recitation of the claims. Accordingly, the disclosure of this description is intended for exemplary explanation, and does not bring any restrictive meaning to the present invention.

The invention claimed is:

1. A terminal comprising:
   a receiver that detects a synchronization (SS)/physical broadcast channel (PBCH) block of a plurality of SS/PBCH blocks which are transmitted respectively in different frequency locations within a carrier and receives a system information corresponding to the detected SS/PBCH block; and
   a processor that uses a random access channel resource for a random access, the random access channel resource being determined based on the system information,
   wherein even in a case that the plurality of SS/PBCH blocks have the same SS/PBCH block index, the processor does not assume that the plurality of SS/PBCH blocks are quasi co-located with respect to average gain, delay parameter, Doppler parameter, and spatial parameter.

2. The terminal according to claim 1, wherein the system information indicates association between one or more indexes of one or more SS/PBCH blocks and one or more random access channel resources.

3. The terminal according to claim 1, wherein the plurality of SS/PBCH blocks correspond to a plurality of cells, respectively.

4. A radio communication method for a terminal comprising:
   detecting a synchronization (SS)/physical broadcast channel (PBCH) block of a plurality of SS/PBCH blocks which are transmitted respectively in different frequency locations within a carrier;
   receiving a system information corresponding to the detected SS/PBCH block; and
   using a random access channel resource for a random access, the random access channel resource being determined based on the system information,
   wherein even in a case that the plurality of SS/PBCH blocks have the same SS/PBCH block index, the terminal does not assume that the plurality of SS/PBCH blocks are quasi co-located with respect to average gain, delay parameter, Doppler parameter, and spatial parameter.

5. A base station comprising:
   a transmitter that respectively transmits a plurality of synchronization (SS)/physical broadcast channel (PBCH) blocks respectively in different frequency locations within a carrier and transmits a system information corresponding to a SS/PBCH block of the plurality of the SS/PBCH blocks; and
   a processor that controls a random access using a random access channel resource determined based on the system information,
   wherein even in a case that the plurality of SS/PBCH blocks have the same SS/PBCH block index, the processor does not assume that the plurality of SS/PBCH blocks are quasi co-located with respect to average gain, delay parameter, Doppler parameter, and spatial parameter.

6. A system comprising:
   a terminal that comprises:
      a receiver that detects a synchronization (SS)/physical broadcast channel (PBCH) block of a plurality of SS/PBCH blocks which are transmitted respectively in different frequency locations within a carrier and receives a system information corresponding to the detected SS/PBCH block; and
      a processor that uses a random access channel resource for a random access, the random access channel resource being determined based on the system information; and
   a base station that transmits the plurality of SS/PBCH blocks and transmits the system information,
   wherein even in a case that the plurality of SS/PBCH blocks have the same SS/PBCH block index, the processor does not assume that the plurality of SS/PBCH blocks are quasi co-located with respect to average gain, delay parameter, Doppler parameter, and spatial parameter.

* * * * *